US008505811B2

(12) United States Patent
Pulley et al.

(10) Patent No.: US 8,505,811 B2
(45) Date of Patent: Aug. 13, 2013

(54) ANOMALOUS BILLING EVENT CORRELATION ENGINE

(75) Inventors: Christopher B. Pulley, Indian Trail, NC (US); Michael T. deLaveaga, Newark, DE (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/184,695

(22) Filed: Jul. 18, 2011

(65) Prior Publication Data

US 2013/0024331 A1 Jan. 24, 2013

(51) Int. Cl.
*G06F 7/00* (2006.01)

(52) U.S. Cl.
USPC .............................. 235/376; 235/380; 705/30

(58) Field of Classification Search
USPC ........... 235/375, 376, 380, 383, 487; 705/30, 705/34
See application file for complete search history.

(56) References Cited

U.S. PATENT DOCUMENTS 5,956,700 A * 9/1999 Landry .......................... 705/40
6,363,362 B1 * 3/2002 Burfield et al. ................. 705/40
6,505,173 B1 * 1/2003 Weibel et al. ................... 705/34
6,655,583 B2 * 12/2003 Walsh et al. .................. 235/380
6,839,684 B1 * 1/2005 Rissanen et al. ................ 705/34
6,996,542 B1 * 2/2006 Landry .......................... 705/40
7,003,494 B2 * 2/2006 Beach et al. .................... 705/40
7,062,509 B1 * 6/2006 Nenov et al. .......................... 1/1
7,155,409 B1 * 12/2006 Stroh ............................. 705/37
7,416,131 B2 * 8/2008 Fortune et al. ................ 235/487
7,515,696 B2 * 4/2009 Engelhart ................ 379/114.28
7,657,436 B2 * 2/2010 Elmore et al. ................ 705/1.1
7,895,357 B1 * 2/2011 Walker .......................... 709/238
8,036,962 B2 * 10/2011 Crumbach et al. .............. 705/34
8,195,537 B2 * 6/2012 Bey et al. ........................ 705/30
2004/0049459 A1 3/2004 Philliou et al.
2008/0208707 A1 8/2008 Erbey et al.
2009/0248467 A1 10/2009 Bulman et al.

* cited by examiner

*Primary Examiner* — Andrew Joseph Rudy

(74) *Attorney, Agent, or Firm* — Weiss & Arons LLP; Michael A. Springs, Esq.

(57) ABSTRACT

Apparatus, methods and computer readable media for processing invoice data. The apparatus may include, and the methods and media may involve a processor module and a machine memory module. The processor module may extract from an invoice a billing event identifier that identifies a billing event. The processor module may query an index in the machine memory module for a billing event descriptor that is designated for the billing event. The processor module may identify in the machine memory index a provisional billing event descriptor that corresponds to a derivative of the billing event identifier. The processor module may join the provisional billing event descriptor to a record corresponding to the billing event identifier. The processor module may flag the record to indicate the presence of the provisional billing event descriptor.

18 Claims, 17 Drawing Sheets

500

502 504

INVOICE NORMAL TEMPLATE

| FIELD NUMBER | FIELD |
|---|---|
| 1 | BILLING EVENT NUMBER |
| 2 | SERVICE CODE |
| 3 | DESCRIPTION |
| 4 | VENDOR |
| 5 | RATE TYPE |
| 6 | UNIT OF MEASURING CODE |
| 7 | UNITS |
| 8 | RATE |
| 9 | SUB-TOTAL |
| 10 | TAX |
| 11 | TOTAL INCL. TAX |
| 12 | INVOICE NUMBER |
| 13 | PROCURING ENTITY CONSTITUENT I.D. |
| 14 | INVOICE DATE |
| 15 | YEAR-MONTH |
| 16 | VENDOR DESCRIPTION |
| 17 | INVOICE TRACKING NUMBER |
| 18 | PAYMENT TYPE |
| 19 | CURRENCY |
| 20 | ARCHIVE DATE |
| 21 | COMMENTS |
| 22 | ADJUSTMENT |

FIG. 5

600

VENDOR 1

CUSTOMER NAME: PROCURING COMPANY
ATTENTION: EMPLOYEE A
1 MAIN STREET
ANYTOWN, ANYSTATE

INVOICE NO.: XXXXX1001
CURRENCY: USD
BILLING CYCLE DATE: 01-31-2011

| ITEM NO. | ITEM | SYMBOL | DESCRIPTION | QTY | RATE | SUBT | TAX | TOTAL |
|---|---|---|---|---|---|---|---|---|
| 1 | EEEE111 | S-O-P-000-200, DTP (DOOR TO PORT) | SURFACE, OVERSEAS, PARCEL, FROM US TO COUNTRY200, DTP, GW, LBS | 314 | 6.29 | $1,975.06 | $132.33 | $2,107.39 |
| ⋮ | ⋮ | ⋮ | ⋮ | ⋮ | ⋮ | ⋮ | ⋮ | ⋮ |
| 1974 | EEEE136 | S-O-P-000-324, PTP (PORT TO PORT) | SURFACE, OVERSEAS, FULL CONTAINER, FROM US TO COUNTRY324, PTP, GW, LBS | 95 | 3.41 | $323.95 | $21.70 | $345.65 |
| 1975 | EEEE122 | A-C-P, 113-082, PTP | AIR, INTRA-CONTINENTAL, FULL PALLET, FROM COUNTRY 113 TO COUNTRY 182, PTP, FLAT23 (CONTRACT RATE CAT 23) | 109 | 360 | $39,240.00 | $2,629.08 | $41,869.08 |
| 1976 | EEEE127 | G-D-C, 000-000, PTD | GROUND, DOMESTIC, FULL CONTAINER, US TO US, DTD, GW, LBS | 10,400 | 1.80 | $18,720.00 | $1,254.24 | $19,974.24 |
| TOTAL FOR SERVICE | | | | | | $960,259.01 | $48,012.95 | $1,008,271.96 |

COLLECTION METHOD: WT
BILLABLE CUSTOMER: CCCCC102
SERVICE CODE: LS

FIG. 6

BILLING EVENT DESCRIPTORS NORMAL TEMPLATE

800

802 804 806

| DESCRIPTOR NUMBER | FIELD | VALID VALUES A=ALPHA; N=NUMBERIC |
|---|---|---|
| 1 | BILLING EVENT IDENTIFIER | AAAANNN; NNNNNNN; N - - NNNNNN |
| 2 | BILLING EVENT SHORT NUMBER | NN; NNN; NNNN; AA; AAA; AAAA |
| 3 | VENDOR SUMMARY DESCRIPTION | AN (DISCRETIONARY) |
| 4 | SERVICE DESCRIPTION | AN (DISCRETIONARY) |
| 5 | DETAILED DESCRIPTION | AN (DISCRETIONARY) |
| 6 | PROCURING ENTITY CATEGORY | SET PICK LIST |
| 7 | PROCURING ENTITY CONSTITUENT IDENTIFIER | SET PICK LIST |
| 8 | TYPE | B2B; P2P; B2P |
| 9 | FREQUENCY | DAILY; WEEKLY; MONTHLY |
| 10 | POINT OF INTERACTION (POI) | RETAIL; WAREHOUSE; SELF SERVICE |
| 11 | ACCOUNT NUMBER | NNNNNN |
| 12 | OFFSET ACCOUNT [SUB-ACCOUNT?] | NNNNNN |
| 13 | DRIVER | 'D' OR 'T' |
| 14 | DATE OF UPDATE | MM/DD/YYYY |
| 15 | DATE BILLING ENTRY ADDED | MM/DD/YYYY |
| 16 | DATE BILLING ENTRY CHANGED | MM/DD/YYYY |
| 17 | COMMENTS | MM/DD/YYYY |
| 18 | PROCURING ENTITY CATEGORY2 | AN (DISCRETIONARY) |
| 19 | DATE OF CHANGE OF CATEGORY | MM/DD/YYYY |
| 20 | CATEGORY3 | SET PICK LIST |
| 21 | DATE OF CHANGE OF CATEGORY | MM/DD/YYYY |
| 22 | ADJUSTMENTS | N |
| 23 | PROCURING ENTITY TREATMENT | AN (DISCRETIONARY) |
| 24 | TREATMENT DESCRIPTION | AN (DISCRETIONARY) |
| 25 | DATE OF CHANGE OF TREATMENT | MM/DD/YYYY |
| 26 | SHARE SERVICES | YES OR NO |
| 27 | SERVICE INDICATOR | SET PICK LIST |
| 28 | SERVICE TYPE | SET PICK LIST |
| 29 | SENDING RECEIVING | SET PICK LIST |
| 30 | SERVICE INDICATOR COMMENTS | AN (DISCRETIONARY) |
| 31 | REQUEST FOR PROPOSAL CATEGORIES | SET PICK LIST |
| 32 | CHANGE IN REQUEST FOR PROPOSAL CATEGORIES | SET PICK LIST |
| 33 | DOMESTIC/INTERNATIONAL | 'D' OR 'I' |

FIG. 8

900

1 VENDOR 1 BILLING REFERENCE GUIDE 3 5

| BILLING ITEM | ITEM TYPE | ITEM TYPE DESCRIPTION |
|---|---|---|
| EEEE101 | PARCEL SHIPMENT | GROUND TRUCK EXPEDITED IN-COUNTRY |
| EEEE102 | PARCEL SHIPMENT | GROUND TRUCK EXPEDITED CUSTOMS |
| EEEE103 | PARCEL SHIPMENT | GROUND TRUCK REGULAR IN-COUNTRY |
| EEEE104 | PARCEL SHIPMENT | GROUND TRUCK REGULAR CUSTOMS |
| EEEE105 | PARCEL SHIPMENT | GROUND RAIL EXPEDITED IN-COUNTRY |
| EEEE106 | PARCEL SHIPMENT | GROUND RAIL EXPEDITED CUSTOMS |
| EEEE107 | PARCEL SHIPMENT | GROUND RAIL REGULAR IN-COUNTRY |
| EEEE108 | PARCEL SHIPMENT | GROUND RAIL REGULAR CUSTOMS |
| EEEE109 | PARCEL SHIPMENT | AIR EXPEDITED IN-COUNTRY |
| EEEE110 | PARCEL SHIPMENT | AIR EXPEDITED CUSTOMS |
| EEEE111 | PARCEL SHIPMENT | SEA EXPEDITED IN-COUNTRY |
| EEEE112 | PARCEL SHIPMENT | SEA EXPEDITED CUSTOMS |
| EEEE113 | PALLET SHIPMENT | GROUND TRUCK EXPEDITED IN-COUNTRY |
| EEEE114 | PALLET SHIPMENT | GROUND TRUCK EXPEDITED CUSTOMS |
| EEEE115 | PALLET SHIPMENT | GROUND TRUCK REGULAR IN-COUNTRY |
| EEEE116 | PALLET SHIPMENT | GROUND TRUCK REGULAR CUSTOMS |
| EEEE117 | PALLET SHIPMENT | GROUND RAIL EXPEDITED IN-COUNTRY |
| EEEE118 | PALLET SHIPMENT | GROUND RAIL EXPEDITED CUSTOMS |
| EEEE119 | PALLET SHIPMENT | GROUND RAIL REGULAR IN-COUNTRY |
| EEEE120 | PALLET SHIPMENT | GROUND RAIL REGULAR CUSTOMS |
| EEEE121 | PALLET SHIPMENT | AIR EXPEDITED IN-COUNTRY |
| EEEE122 | PALLET SHIPMENT | AIR EXPEDITED CUSTOMS |
| EEEE123 | PALLET SHIPMENT | SEA EXPEDITED IN-COUNTRY |
| EEEE124 | PALLET SHIPMENT | SEA EXPEDITED CUSTOMS |
| EEEE125 | CONTAINER SHIPMENT | GROUND TRUCK EXPEDITED IN-COUNTRY |
| EEEE126 | CONTAINER SHIPMENT | GROUND TRUCK EXPEDITED CUSTOMS |
| EEEE127 | CONTAINER SHIPMENT | GROUND TRUCK REGULAR IN-COUNTRY |
| EEEE128 | CONTAINER SHIPMENT | GROUND TRUCK REGULAR CUSTOMS |
| EEEE129 | CONTAINER SHIPMENT | GROUND RAIL EXPEDITED IN-COUNTRY |
| EEEE130 | CONTAINER SHIPMENT | GROUND RAIL EXPEDITED CUSTOMS |
| EEEE131 | CONTAINER SHIPMENT | GROUND RAIL REGULAR IN-COUNTRY |
| EEEE132 | CONTAINER SHIPMENT | GROUND RAIL REGULAR CUSTOMS |
| EEEE133 | CONTAINER SHIPMENT | AIR EXPEDITED IN-COUNTRY |
| EEEE134 | CONTAINER SHIPMENT | AIR EXPEDITED CUSTOMS |
| EEEE135 | CONTAINER SHIPMENT | SEA EXPEDITED IN-COUNTRY |
| EEEE136 | CONTAINER SHIPMENT | SEA EXPEDITED CUSTOMS |
| EEEE137 | OVERSIZED CARGO | GROUND TRUCK EXPEDITED IN-COUNTRY |

FIG. 9A

VENDOR 1 BILLING REFERENCE GUIDE (CONTINUED)

| BILLING ITEM | ITEM TYPE | ITEM TYPE DESCRIPTION |
|---|---|---|
| EEEE138 | OVERSIZED CARGO | GROUND TRUCK EXPEDITED CUSTOMS |
| EEEE140 | OVERSIZED CARGO | GROUND TRUCK REGULAR CUSTOMS |
| EEEE141 | OVERSIZED CARGO | GROUND RAIL EXPEDITED IN-COUNTRY |
| EEEE142 | OVERSIZED CARGO | GROUND RAIL EXPEDITED CUSTOMS |
| EEEE143 | OVERSIZED CARGO | GROUND RAIL REGULAR IN-COUNTRY |
| EEEE144 | OVERSIZED CARGO | GROUND RAIL REGULAR CUSTOMS |
| EEEE145 | OVERSIZED CARGO | AIR EXPEDITED IN-COUNTRY |
| EEEE146 | OVERSIZED CARGO | AIR EXPEDITED CUSTOMS |
| EEEE147 | OVERSIZED CARGO | SEA EXPEDITED IN-COUNTRY |
| EEEE148 | OVERSIZED CARGO | SEA EXPEDITED CUSTOMS |
| EEEE149 | REPORTING | ITEM TRACKING-INDIVIDUAL |
| EEEE150 | REPORTING | ITEM TRACKING-PROJECT |
| EEEE151 | PROJECT DESIGN | MANIFEST COORDINATION IN-COUNTRY |
| EEEE152 | PROJECT DESIGN | MANIFEST COORDINATION CUSTOMS |

FIG. 9B

1000

1 VENDOR 2 BILLING REFERENCE GUIDE 3 5

| SERVICE | SERVICE TYPE | DETAIL |
|---|---|---|
| 9999909 | PACKAGE SHIPMENT | DOMESTIC TRAILER EXPEDITED |
| 9999910 | PACKAGE SHIPMENT | INTERNATIONAL TRAILER EXPEDITED |
| 9999911 | PACKAGE SHIPMENT | DOMESTIC TRAILER REGULAR |
| 9999912 | PACKAGE SHIPMENT | INTERNATIONAL TRAILER EXPEDITED |
| 9999913 | PACKAGE SHIPMENT | DOMESTIC TRAIN CARRIAGE EXPEDITED |
| 9999914 | PACKAGE SHIPMENT | INTERNATIONAL TRAIN CARRIAGE EXPEDITED |
| 9999915 | PACKAGE SHIPMENT | DOMESTIC TRAIN CARRIAGE REGULAR |
| 9999916 | PACKAGE SHIPMENT | INTERNATIONAL TRAIN CARRIAGE |
| 9999917 | PACKAGE SHIPMENT | DOMESTIC AIR CARGO EXPEDITED |
| 9999918 | PACKAGE SHIPMENT | INTERNATIONAL AIR CARGO EXPEDITED |
| 9999919 | PACKAGE SHIPMENT | DOMESTIC MARINE TRANSPORT |
| 9999920 | PACKAGE SHIPMENT | INTERNATIONAL MARINE TRANSPORT |
| 9999921 | PALLET-STANDARD | DOMESTIC TRAILER EXPEDITED |
| 9999922 | PALLET-STANDARD | INTERNATIONAL TRAILER EXPEDITED |
| 9999923 | PALLET-STANDARD | DOMESTIC TRAILER REGULAR |
| 9999924 | PALLET-STANDARD | INTERNATIONAL TRAILER EXPEDITED |
| 9999925 | PALLET-STANDARD | DOMESTIC TRAIN CARRIAGE EXPEDITED |
| 9999926 | PALLET-STANDARD | INTERNATIONAL TRAIN CARRIAGE EXPEDITED |
| 9999927 | PALLET-STANDARD | DOMESTIC TRAIN CARRIAGE REGULAR |
| 9999928 | PALLET-STANDARD | INTERNATIONAL TRAIN CARRIAGE |
| 9999929 | PALLET-STANDARD | DOMESTIC AIR CARGO EXPEDITED |
| 9999930 | PALLET-STANDARD | INTERNATIONAL AIR CARGO EXPEDITED |
| 9999931 | PALLET-STANDARD | DOMESTIC MARINE TRANSPORT |
| 9999932 | PALLET-STANDARD | INTERNATIONAL MARINE TRANSPORT |
| 9999933 | PARTIAL CONTAINER | DOMESTIC TRAILER EXPEDITED |
| 9999934 | PARTIAL CONTAINER | INTERNATIONAL TRAILER EXPEDITED |
| 9999935 | PARTIAL CONTAINER | DOMESTIC TRAILER REGULAR |
| 9999936 | PARTIAL CONTAINER | INTERNATIONAL TRAILER EXPEDITED |
| 9999937 | PARTIAL CONTAINER | DOMESTIC TRAIN CARRIAGE EXPEDITED |
| 9999938 | PARTIAL CONTAINER | INTERNATIONAL TRAIN CARRIAGE EXPEDITED |
| 9999939 | PARTIAL CONTAINER | DOMESTIC TRAIN CARRIAGE REGULAR |
| 9999940 | PARTIAL CONTAINER | INTERNATIONAL TRAIN CARRIAGE |
| 9999941 | PARTIAL CONTAINER | DOMESTIC AIR CARGO EXPEDITED |
| 9999942 | PARTIAL CONTAINER | INTERNATIONAL AIR CARGO EXPEDITED |
| 9999943 | PARTIAL CONTAINER | DOMESTIC MARINE TRANSPORT |
| 9999944 | PARTIAL CONTAINER | INTERNATIONAL MARINE TRANSPORT |
| 9999945 | CONTAINER SHIPMENT | DOMESTIC TRAILER EXPEDITED |

FIG. 10A

VENDOR 2 BILLING REFERENCE GUIDE (CONTINUED)

| SERVICE | SERVICE TYPE | DETAIL |
|---|---|---|
| 9999946 | CONTAINER SHIPMENT | INTERNATIONAL TRAILER EXPEDITED |
| 9999947 | CONTAINER SHIPMENT | DOMESTIC TRAILER REGULAR |
| 9999948 | CONTAINER SHIPMENT | INTERNATIONAL TRAILER EXPEDITED |
| 9999949 | CONTAINER SHIPMENT | DOMESTIC TRAIN CARRIAGE EXPEDITED |
| 9999950 | CONTAINER SHIPMENT | INTERNATIONAL TRAIN CARRIAGE EXPEDITED |
| 9999951 | CONTAINER SHIPMENT | DOMESTIC TRAIN CARRIAGE REGULAR |
| 9999952 | CONTAINER SHIPMENT | INTERNATIONAL TRAIN CARRIAGE |
| 9999953 | CONTAINER SHIPMENT | DOMESTIC AIR CARGO EXPEDITED |
| 9999954 | CONTAINER SHIPMENT | INTERNATIONAL AIR CARGO EXPEDITED |
| 9999955 | CONTAINER SHIPMENT | DOMESTIC MARINE TRANSPORT |
| 9999956 | CONTAINER SHIPMENT | INTERNATIONAL MARINE TRANSPORT |
| 9999957 | OVERSIZED CARGO | DOMESTIC TRAILER EXPEDITED |
| 9999958 | OVERSIZED CARGO | INTERNATIONAL TRAILER EXPEDITED |
| 9999959 | OVERSIZED CARGO | DOMESTIC TRAILER REGULAR |
| 9999960 | OVERSIZED CARGO | INTERNATIONAL TRAILER EXPEDITED |
| 9999961 | OVERSIZED CARGO | DOMESTIC TRAIN CARRIAGE EXPEDITED |
| 9999962 | OVERSIZED CARGO | INTERNATIONAL TRAIN CARRIAGE EXPEDITED |
| 9999963 | OVERSIZED CARGO | DOMESTIC TRAIN CARRIAGE REGULAR |
| 9999964 | OVERSIZED CARGO | INTERNATIONAL TRAIN CARRIAGE |
| 9999965 | OVERSIZED CARGO | DOMESTIC AIR CARGO EXPEDITED |
| 9999966 | OVERSIZED CARGO | INTERNATIONAL AIR CARGO EXPEDITED |
| 9999967 | OVERSIZED CARGO | DOMESTIC MARINE TRANSPORT |
| 9999968 | OVERSIZED CARGO | INTERNATIONAL MARINE TRANSPORT |
| 9999969 | REPORTING | MANIFEST REPORT |
| 9999970 | REPORTING | MULTI-MANIFEST REPORT |
| 9999971 | PROJECT DESIGN | DOMESTIC MANIFEST COORDINATION |
| 9999972 | PROJECT DESIGN | INTERNATIONAL MANIFEST COORDINATION |

FIG. 10B

1400

| 1402 PROCURING ENTITY SYSTEM RECORD ID | 1404 VENDOR ID | 1406 BILLING EVENT IDENTIFIER | 1408 VENDOR SUMMARY DESCRIPTION | 1410 DETAILED DESCRIPTION | 1412 PROCURING ENTITY CATEGORY | 1416 ANOMALOUS BILLING EVENT FLAG |
|---|---|---|---|---|---|---|
| ⋮ | ⋮ | ⋮ | ⋮ | ⋮ | | ⋮ |
| 10,990,101 | 1 | EEEE127 | CONTAINER SHIPMENT | GROUND TRUCK REGULAR IN-COUNTRY | LOCAL HOUSE BRAND WHOLESALE | 0 |
| 10,990,102 | 1 | EEEE134 | CONTAINER SHIPMENT | AIR EXPEDITED CUSTOMS | FOREIGN HOUSE BRAND WHOLESALE | 0 |
| 10,990,103 | 1 | EEEE13X | UNKNOWN | UNKNOWN | FOREIGN HOUSE BRAND WHOLESALE | 1 |
| 10,990,104 | 1 | EEEE126 | CONTAINER SHIPMENT | GROUND TRUCK EXPEDITED CUSTOMS | FOREIGN HOUSE BRAND WHOLESALE | 0 |
| 10,990,105 | 1 | EEEE108 | PARCEL SHIPMENT | GROUND RAIL REGULAR CUSTOMS | FOREIGN RETAIL | 0 |
| ⋮ | ⋮ | ⋮ | ⋮ | ⋮ | | ⋮ |

FIG. 14

1500

| DERIVATIVE BILLING EVENT IDENTIFIER (1502) | DETAILED DESCRIPTION (DESCRIPTOR 5 IN TEMPLATE 800) (1504) | PROCURING ENTITY CATEGORY (DESCRIPTOR 6 IN TEMPLATE 800) (1506) |
|---|---|---|
| EEEE13 | GROUND RAIL EXPEDITED CUSTOMS | FOREIGN HOUSE BRAND WHOLESALE |
| EEEE13 | GROUND RAIL REGULAR IN-COUNTRY | LOCAL HOUSE BRAND WHOLESALE |
| EEEE13 | AIR EXPEDITED CUSTOMS | FOREIGN HOUSE BRAND WHOLESALE |
| EEEE13 | SEA EXPEDITED IN-COUNTRY | LOCAL HOUSE BRAND WHOLESALE |
| EEEE13 | SEA EXPEDITED CUSTOMS | FOREIGN HOUSE BRAND WHOLESALE |
| EEEE13 | GROUND TRUCK EXPEDITED IN-COUNTRY | CUSTOM PROJECT DOMESTIC |
| EEEE13 | GROUND TRUCK EXPEDITED CUSTOMS | CUSTOM PROJECT INTERNATIONAL |
| EEEE13 | GROUND TRUCK REGULAR IN-COUNTRY | CUSTOM PROJECT DOMESTIC |

FIG. 15

1600

| DERIVATIVE BILLING EVENT IDENTIFIER | DETAILED DESCRIPTION (DESCRIPTOR 5 IN TEMPLATE 800) | COUNT (1602) |
|---|---|---|
| EEEE13 | GROUND RAIL EXPEDITED CUSTOMS | 1 |
| EEEE13 | GROUND RAIL REGULAR IN-COUNTRY | 1 |
| EEEE13 | AIR EXPEDITED CUSTOMS | 1 |
| EEEE13 | SEA EXPEDITED IN-COUNTRY | 1 |
| EEEE13 | SEA EXPEDITED CUSTOMS | 1 |
| EEEE13 | GROUND TRUCK EXPEDITED IN-COUNTRY | 1 |
| EEEE13 | GROUND TRUCK EXPEDITED CUSTOMS | 1 |
| EEEE13 | GROUND TRUCK REGULAR IN-COUNTRY | 1 |

FIG. 16

1700

| DERIVATIVE BILLING EVENT IDENTIFIER | PROCURING ENTITY CATEGORY (DESCRIPTOR 6 IN TEMPLATE 800) | COUNT (1702) |
|---|---|---|
| EEEE13 | FOREIGN HOUSE BRAND WHOLESALE | 3 |
| EEEE13 | LOCAL HOUSE BRAND WHOLESALE | 2 |
| EEEE13 | CUSTOM PROJECT DOMESTIC | 2 |
| EEEE13 | CUSTOM PROJECT INTERNATIONAL | 1 |

FIG. 17

1800

| 1802 PROCURING ENTITY SYSTEM RECORD ID | 1804 VENDOR ID | 1806 BILLING EVENT REMINDER | 1808 VENDOR SUMMARY DESCRIPTION | 1810 DETAILED DESCRIPTION | 1812 PROCURING ENTITY CATEGORY | 1814 ANOMALOUS BILLING EVENT FLAG |
|---|---|---|---|---|---|---|
| ⋮ | ⋮ | ⋮ | ⋮ | ⋮ | | ⋮ |
| 10,990,101 | 1 | EEEE127 | CONTAINER SHIPMENT | GROUND TRUCK REGULAR IN-COUNTRY | LOCAL HOUSE BRAND WHOLESALE | 0 |
| 10,990,102 | 1 | EEEE134 | CONTAINER SHIPMENT | AIR EXPEDITED CUSTOMS | FOREIGN HOUSE BRAND WHOLESALE | 0 |
| 10,990,103 | 1 | EEEE13X | UNKNOWN | UNKNOWN | FOREIGN HOUSE BRAND WHOLESALE | 1 |
| 10,990,104 | 1 | EEEE126 | CONTAINER SHIPMENT | GROUND TRUCK EXPEDITED CUSTOMS | FOREIGN HOUSE BRAND WHOLESALE | 0 |
| 10,990,105 | 1 | EEEE108 | PARCEL SHIPMENT | GROUND RAIL REGULAR CUSTOMS | FOREIGN RETAIL | 0 |
| ⋮ | ⋮ | ⋮ | ⋮ | ⋮ | | ⋮ |

FIG. 18

ANOMALOUS BILLING EVENT CORRELATION ENGINE

FIELD OF TECHNOLOGY

This application relates to managing accounts payable data. More specifically, the application relates to management of accounts payable data that includes anomalous data.

BACKGROUND OF THE INVENTION

An entities that procures goods and services from different vendors often receives invoices and descriptive documentation from the vendors. The invoices identify the goods and services, provide information about the vendors, the entity, the goods and services, and amounts that are due in connection with the goods and services. The descriptive information may include descriptions of the goods and services. The entity may procure goods and services from more than one vendor in a market sector. The vendors in the market sector may provide to the entity goods and services that are similar. In the invoices and the descriptive documentation, the vendors may identify the similar goods and services, and describe them, using disparate formats, nomenclature or otherwise disparate presentation. The invoices may present goods and services using information that is not described in the descriptive documentation or is inadequately described in the descriptive documentation. The entity may seek to categorize the goods and services to support cost management measures. Because of the disparate or deficient presentation of the similar goods and services, it may be difficult for the entity to process the invoices in a manner that supports cost management.

It would be desirable, therefore, to provide apparatus, methods and media for processing invoice data.

SUMMARY OF THE INVENTION

Apparatus, methods and computer readable media for processing invoice data are provided. The apparatus may include, and the methods and media may involve a processor module and a machine memory module. The processor module may extract from an invoice a billing event identifier that identifies a billing event. The processor module may query an index in the machine memory module for a billing event descriptor that is designated for the billing event. The processor module may identify in the machine memory index a provisional billing event descriptor that corresponds to a derivative of the billing event identifier. The processor module may join the provisional billing event descriptor to a record corresponding to the billing event identifier. The processor module may flag the record to indicate the presence of the provisional billing event descriptor.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 5 shows other illustrative information in accordance with the principles of the invention;

FIG. 6 shows yet other illustrative information in accordance with the principles of the invention;

FIG. 8 show still other illustrative information in accordance with the principles of the invention;

FIGS. 9A and 9B show still other illustrative information in accordance with the principles of the invention;

FIGS. 10A and 10B show still other illustrative information in accordance with the principles of the invention;

FIG. 14 shows still other illustrative information in accordance with the principles of the invention;

FIG. 15 shows still other illustrative information in accordance with the principles of the invention;

FIG. 16 shows still other illustrative information in accordance with the principles of the invention;

FIG. 17 shows still other illustrative information in accordance with the principles of the invention; and FIG. 18 shows still other illustrative information in accordance with the principles of the invention;

DETAILED DESCRIPTION OF THE INVENTION

Figure 1:
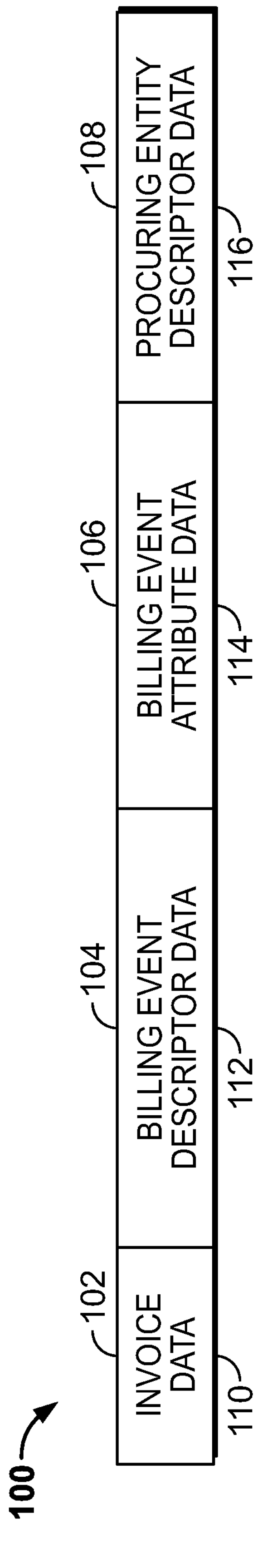
FIG. 1 shows illustrative information in accordance with the principles of the invention.

Apparatus, methods and media are provided for processing invoice data. The one or more of the methods may be performed using the some or all of the apparatus. One or more of the media my include instructions for machine performance of some or all of the methods.

The invoice data may be present in one or more invoices that are provided by one or more vendors to a procuring entity. Table 1 shows illustrative procuring entity industries and illustrative corresponding vendor services sectors. A procuring entity may procure services from one or more vendors in a sector. It will be understood that "services" may include both goods and services.

TABLE 1

Illustrative Industries and Corresponding Vendor Services Sectors

| Illustrative Procuring Entity Industries | Illustrative Vendor Services Sectors |
|---|---|
| Manufacturing | Parts<br>Raw Materials<br>Transportation |
| Business Services | Logistics<br>Business Continuity |
| Construction | Materials<br>Services |
| Technology | Data Storage<br>Network services<br>Application Software |
| Financial | Banking Services<br>Payment Network Services<br>Investment Services |
| Consumer Goods | Appliances<br>Parts<br>Electronic Equipment |
| Basic Materials | Lumber |

The apparatus may include, and the methods and media may involve, a processor module and a machine memory module. The processor module may include hardware. The processor module may extract from an invoice a billing event identifier that identifies a billing event. The billing event may correspond to a service that a vendor provided to the procuring entity. The processor module may query an index in the machine memory module for a billing event descriptor that is designated for the billing event. The billing event descriptor may describe a service to which the billing event identifier corresponds.

Table 2 shows illustrative billing event descriptors for billing events that may arise in the financial services industry in connection with vendors of financial network services.

TABLE 2

Illustrative Billing Event Descriptors for the Financial Services Industry In Connection With Vendors of Financial Network Services.

| Illustrative Billing Event Identifier | Illustrative Billing Event Descriptors for the Financial Services Industry In Connection With Vendors of Financial Network Services — Summary Descriptor | Detailed Descriptor |
|---|---|---|
| 1--345678 | PLATFORM MANAGEMENT SYSTEM | SERVICE - ONLINE UPDATES |
| 5--4567890 | ACQUIRER CALL REFERRAL | MEMBER INTERNATIONAL |
| 3--5678901 | VENDOR SWITCH | PROGRAM FEE ENHANCED |
| 4--12345678 | CONNECTIVITY/EQUIPMENT | KEY MANAGEMENT SERVICES RESIDENCY |
| 5--53456789 | DAILY OPERATIONS | ISSUER PURCHASES |
| 6--11122233 | ELECTRONIC COMMERCE | VENDORCODE SYSTEM |
| 7--1232456 | FILE MAINTENANCE | MAINTENANCE ONLINE |
| 8--62345678 | FILE TRANSMISSION | FILE FEE REBATE |
| 9--98765432 | FRANCHISE/LICENSE | MONTHLY FEE |
| 0-87654321 | GCMS/IPM | UTILITIES WORKSTATION MAINFRAME |
| 5--33344455 | GLOBAL PUBLICATIONS | US BULLETIN: REISSUE |
| 5--76890123 | GLOBAL SERVICE | TELECOM FIXED |
| 5--6789012 | INVESTMENT FEES | FEE PURCHASE INTERNATIONAL |
| 5--11122 | ISSUER | ISSUER INTERNATIONAL |
| 5--5223333 | ISSUER REVERSAL | INTERNATIONAL REVERSAL |
| 5--456789 | ISSUER ASSESSMENT | DOMESTIC VOLUME |
| 5--3334444 | ISSUER AUTHORIZATION | AUTHORIZATION ISSUER PROCESSING FEE |
| 5--9988776 | ISSUER AUTHORIZATION | AUTHORIZATION ISSUER PROCESSING TRAN BLOCK |
| 5--54680 | ISSUER CALL REFERRAL | MEMBER ISSUED CALL REFERRAL INTERNATIONAL |
| 5--1357911 | ISSUER | ISSUER PURCHASE |
| 5--51314151 | ISSUER SWITCH FEES | VENDOR ATM ISSUER SWITCH FEE INTERNATIONAL |
| 5--6171819 | ISSUER TELEX | ISRAEL ISSUER TELEX FEE |
| 5--52324252 | ISSUERS CLEARINGHOUSE | UNAUTHORIZED USE |
| 5--5354555 | PLATFORM MANAGER | ISSUER REFERRAL |
| 5--1234567 | VENDOR ADVISOR FEES | Vendor Advisors Client Billing |
| 5--987654 | VENDORCOM | WORKSTATION - CASE FILINGS |
| 5--123456 | MEMBER CARD PROGRAM | COLLISION DAMAGE WAIVER INSURANCE |
| 5--9999999 | NON-COMPLIANCE FEES | MULTIPLE ACH ACCOUNT FEE |
| 5--888888 | ON-US | FINANCIAL DETAIL COLLECT ONLY INTERNATIONAL |
| 5--7777777 | OPERATIONS/DEVELOPMENT | DOMESTIC ON-US PURCHASE VOLUME |
| 5--5555555 | REPORTS | VENDORCOM ISSUER DETAIL REPORT |
| 5--444444 | SECURITY | EXCESSIVE PROGRAM ISSUER RECOVERY |
| 5--3333333 | SETTLEMENT | SETTLEMENT SERVICE FEE-US |

The processor module may identify in the machine memory index a provisional billing event descriptor that corresponds to a derivative of the billing event identifier. The processor module may join the provisional billing event descriptor to a record corresponding to the billing event identifier. The processor module may flag the record to indicate the presence of the provisional billing event descriptor.

The invoice may be a first invoice. The processor module may extract a plurality of second billing identifiers from a second invoice.

The apparatus may include, and the methods and media may involve, a receiver module that includes hardware. The receiver module may receive the first invoice from a first vendor; and receive the second invoice from a second vendor.

The processor module may formulate the billing event identifier derivative by removing a character from the billing event identifier. The processor module may query the machine memory index for a billing event descriptor that corresponds to the billing event identifier derivative.

If a result of the querying is null, the processor module may iteratively: (1) reformulate the derivative, by removing successive characters from the billing event identifier, and (2) query the machine memory index for a billing event descriptor that corresponds to the billing event identifier derivative.

The processor module may join a default billing event descriptor to the record corresponding to the billing event identifier.

The processor module may terminate the reformulating after a critical number of characters are removed from the billing event identifier.

The processor module hardware may extract from the invoice a billing event information item that corresponds to the billing event identifier. The processor module hardware may calculate an objective closeness metric for each of the billing event descriptors in the machine memory index, each metric corresponding to a closeness between the respective billing event descriptor the billing event information item.

The processor module hardware may define as the provisional billing event descriptor the billing event descriptor that, based on the closeness metric, is closest to the billing event information item.

The objective closeness metric may be based on a statistical prediction, such as an expected value, a maximum number of occurrences, or any other suitable predictor, that a billing event descriptor is more likely to correspond to the billing event identifier than is a different billing event descriptor.

The receiver module may receive a confirmed billing event descriptor that corresponds to the provisional billing event descriptor.

The processor module may adjust, based on a difference between the confirmed billing event descriptor and the provisional billing event descriptor, a constant upon which the objective closeness metric is based.

The methods may include extracting from an invoice a billing event identifier that identifies a billing event. The methods may include querying a machine memory index for a billing event descriptor that is designated for the billing event. The methods may include, if the machine memory index does not include the billing event: identifying, in the machine memory index, a provisional billing event descriptor that corresponds to a derivative of the billing event identifier; joining the provisional billing event descriptor to a record corresponding to the billing event identifer; and flagging the record to indicate the presence of the provisional billing event descriptor.

The methods may include, when the billing event identifier is a first billing event identifier and the record is a first record: extracting a plurality of second billing event identifiers; joining each second billing identifier to a corresponding second record; performing an analytical operation on each of the second records; and performing the analytical operation on the first record.

The extracting a plurality of second billing identifiers may include, when the invoice is a first invoice, extracting the plurality of second billing identifiers from a second invoice.

The methods may include receiving the first invoice from a first vendor; and receiving the second invoice from a second vendor.

The identifying may include formulating the billing event identifier derivative by removing a character from the billing event identifier; and querying the machine memory index for a billing event descriptor that corresponds to the billing event identifier derivative.

The methods may include, when a result of the querying is null, iteratively: reformulating the derivative, by removing successive characters from the billing event identifier, and querying the machine memory index for a billing event descriptor that corresponds to the billing event identifier derivative.

The methods may include, after the iteratively reformulating and querying, joining a default billing event descriptor to the record corresponding to the billing event identifier if the querying does not generate a non-null result.

The methods may include terminating the reformulating after a critical number of characters are removed from the billing event identifier.

The methods may include, after the terminating, joining a default billing event descriptor to the record corresponding to the billing event identifier.

The identifying may include culling the machine memory index for candidate billing event descriptors that correspond to a billing event identifier derivative; and selecting as the provisional billing event descriptor a closest one of the candidate billing event descriptors.

The selecting may include defining as the provisional billing event descriptor the candidate billing event descriptor that is most numerous among the candidate billing event descriptors.

The identifying may include extracting from the invoice a billing event information item that corresponds to the billing event identifier; calculating an objective closeness metric for each of the billing event descriptors in the machine memory index, each metric corresponding to a closeness between the respective billing event descriptor and the billing event information item; and defining as the provisional billing event descriptor the billing event descriptor that, based on the closeness metric, is closest to the billing event information item.

The methods may include outputting to an output device a first cost index and a second cost index. The first cost index may be based on the provisional billing event descriptor. The second cost index may be based on a confirmed billing event descriptor. The first cost index may be based on a plurality of billing events. The second cost index may be based on the plurality of billing events. The methods may include drawing the plurality of billing events from a plurality of invoices.

The methods may include extracting from an invoice a procuring entity consitutent identifier. The constituent may be one of a plurality of constituents. The constituent may be the procuring entity, an individual, a department, a division, a subsidiary, a corporation, a group, an organization, an affinity group or any other constituent. The constituent may be defined by a corporate structure, an organizational chart, a function, an operation, a cost-center, a profit-center, or any suitable characteristic.

The method may include querying the machine memory index for a procuring entity constituent descriptor that is designated for the billing procuring entity constituent. The method may include joining the procuring entity constituent descriptor to the record.

Table 3 shows illustrative procuring entity constituent identifiers and procuring entity constituent descriptors for a hypothetical procuring entity in the manufacturing industry.

TABLE 3

Illustrative Procuring Entity Constituent Identifiers and Procuring Entity Constituent Descriptors for a Hypothetical Procuring Entity in the Manufacturing Industry.

| Illustrative Procuring Entity | Illustrative Constituent Descriptors for a Hypothetical Procuring Entity in the Manufacturing Industry | | |
|---|---|---|---|
| Constituent Identifiers | Organizational Descriptor | Functional Descriptor | Geographic Descriptor |
| MMMM001 | Fulfillment | Sales-Retail | City ABC, USA |
| MMMM002 | Fulfillment | Sales-Wholesale | City ABC, USA |
| MMMM003 | Fulfillment | Sales-processed materials | City EEE, OUS Country |
| . . . | . . . | . . . | . . . |
| MMMM132 | Research & Development | Material field testing | City ABC, USA |
| MMMM133 | Research & Development | Laboratory sample testing | City ABC, USA |
| MMMM134 | Marketing | Samples-retail | City DEF, USA |
| MMMM135 | Marketing | Samples-wholesale | City DEF, USA |
| MMMM136 | Marketing | Samples-processed materials | City EEE, OUS Country |
| MMMM137 | Physical Plant | Maintenance supplies | City ABC, USA |
| MMMM138 | Physical Plant | Capital equipment | City ABC, USA |
| MMMM139 | Physical Plant | Office equipment | City ABC, USA |
| MMMM140 | Sector Specialty Products--Automotive | Sales-Wholesale | City GHI, USA |
| MMMM141 | Sector Specialty Products-Health | Sales-Wholesale | City JKL, USA |
| MMMM142 | Sector Specialty Products-Sporting goods | Sales-Wholesale | City JKL, USA |

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows illustrative billing event record 100. Billing event record 100 may include segments 110, 112, 114 and

116. Each of segments 101 may include one or more fields (not shown). Billing event record 100 may correspond to a single billable service that a vendor provided to the procuring entity. Billing event record 100 may have a structure into which data from disparate sources may be mapped. The structure may include one or more of the fields. The procuring entity may use one, two, several, a plurality or a multitude of billing event records to analyze expenses associated with billing events.

Billing event record 100 may include invoice data 102. Invoice data 102 may include a billing event identifier, billing event information items, vendor information, procurement entity constituent information, and any other invoice information. The apparatus, methods and media may extract invoice data 102 from a vendor invoice.

Billing event record 100 may include billing event descriptor data 104. Billing event descriptor data 104 may include one or more billing event descriptors. The apparatus, methods and media may extract billing event descriptor data 104 from one or more vendor billing reference guides that explain billing events.

Billing event record 100 may include billing event attribute data 106. The procuring entity may develop event attribute data 106 to characterize the billing event in a manner that supports procurement entity cost management objectives. For purposes associated with identifying a billing event descriptor that most likely corresponds to a derivative billing event identifier, billing event attribute data 106 may be referred to as "billing event descriptors."

Billing event record 100 may include procuring entity descriptor data 108. Procuring entity data descriptor 108 may include one or more procuring entity constituent descriptors. The procuring entity may develop procuring entity data descriptor 108 to characterize the billing event in a manner that supports procurement entity cost management objectives.

A billing event identifier may logically link invoice data 102 and billing event descriptor data 104. Procuring entity information, such as a procurement entity constituent identifier, may link invoice data 102 and procuring entity descriptor data 108.

Billing event descriptor data 104 may be provided by a vendor and may describe a billing event. A vendor may provide the billing event descriptor to the procuring entity. The billing event descriptor may explain or partially explain the nature of a billing event that is identified on an invoice by a billing event identifier. The vendor may provide one or more billing event descriptors to the procuring entity in the form of a billing reference manual.

A first vendor may provide a first billing event descriptor for a first billing event. A second vendor may provide second billing event descriptor for a second billing event. The procuring entity may view the first and second billing events as being identical, similar, similar in part, or entirely different. The procuring entity may thus join billing event attributes data 106 to each billing event record to characterize the billing event in a way that is meaningful to the procuring entity and is based on vendor-provided billing event descriptors for the billing event.

Billing event records such as 100 may thus have a uniform structure and include differently structured data from different sources. A plurality of such billing events may be assembled into a data set that may be used to analyze procuring entity expenses.

Figure 2:
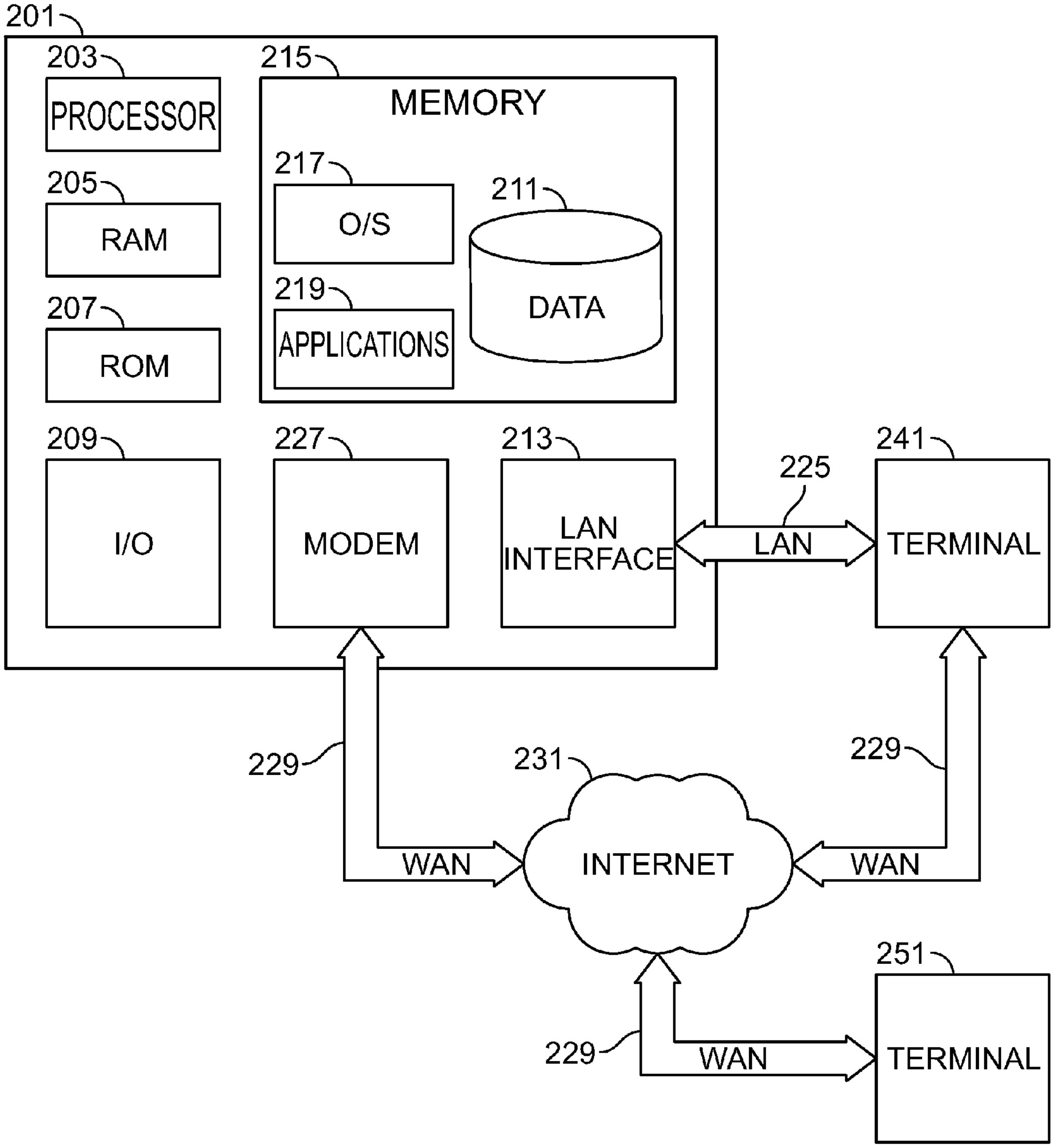
FIG. 2 shows illustrative apparatus that may be used in accordance with the principles of the invention.

FIG. 2 is a block diagram that illustrates a generic computing device 201 (alternatively referred to herein as a "server") that may be used in accordance with the principles of the invention. Server 201 may be included in any suitable apparatus that is shown or described herein. Server 201 may have a processor 203 for controlling overall operation of the server and its associated components, including RAM 205, ROM 207, input/output module 209, and memory 225.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 225 and/or storage to provide instructions to processor 203 for enabling server 201 to perform various functions. For example, memory 225 may store software used by server 201, such as an operating system 217, application programs 219, and an associated database 221. Alternatively, some or all of server 201 computer executable instructions may be embodied in hardware or firmware (not shown).

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 223. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, cell phone, Blackberry™, or any other suitable device for storing, transmitting and/or transporting relevant information.

Any information described above in connection with database 221, and any other suitable information, may be stored in memory 225.

One or more of applications 219 may include one or more algorithms that may be used to process invoice data, assemble billing event record data sets, correlate billing events and billing event descriptors, analyze billing events, report billing event analysis, and/or perform any other suitable tasks related to processing invoice data.

The invention may be operational with numerous other general purpose or special purpose computing system environments or configurations. Examples of well known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 3:
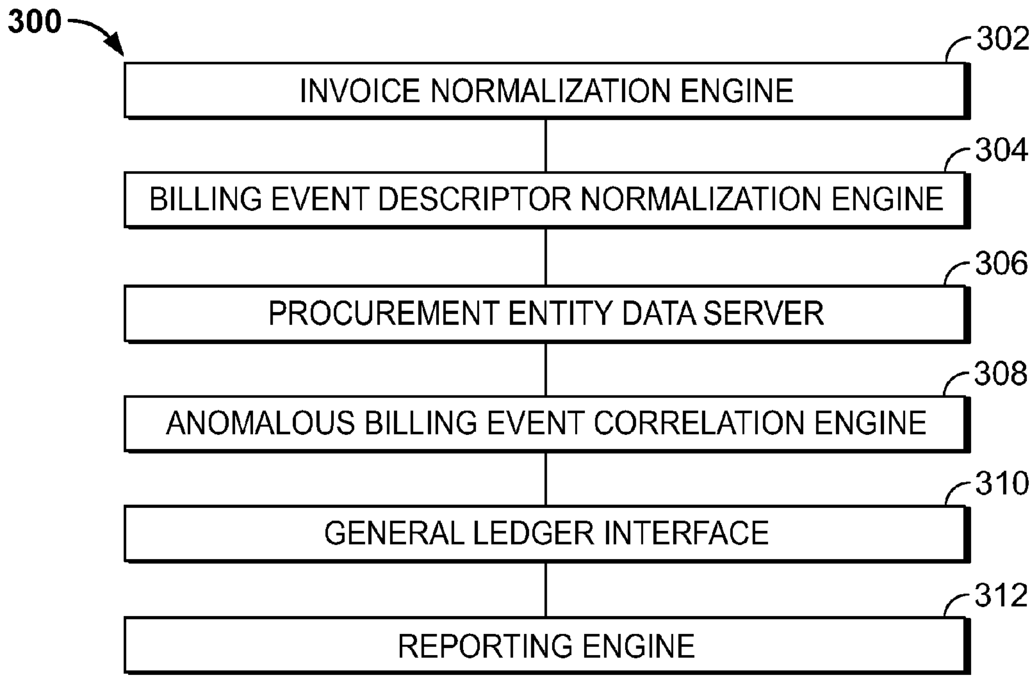
FIG. 3 shows illustrative elements of a process in accordance with the principles of the invention.

FIG. 3 shows illustrative apparatus 300 for processing invoice data. Apparatus 300 may be include some, all, multiples or none of the features of computing device 201 (shown in FIG. 2).

Apparatus 300 may include invoice normalization engine 302. Invoice normalization engine 302 may receive an invoice. Invoice normalization engine 302 may map the invoice data into data structures in a billing event record such as 100 (shown in FIG. 1). For example, invoice normalization engine 302 may map invoice data into invoice data 102.

The invoice may be an electronic invoice. The invoice may be a paper invoice. Invoice normalization engine 302 may scan the paper invoice and generate an electronic invoice from the paper invoice. The electronic invoice may include one or more invoice data fields that may include invoice data.

The electronic invoice may have a format. The format may govern the arrangement of the invoice data fields in the invoice. The format may govern the type of data structure that holds the data from an invoice data field. The format may govern the labels that are applied to the different invoice data fields. The format may be a commercial invoice format. For example, the format may be a vendor proprietary format, a commercially available invoice format or any other suitable format. The invoice may identify services that the vendor provided to the procurement entity. The invoice may include tens, thousands, or hundreds of thousands of services.

Each vendor may use one or more different formats. Invoice normalization engine 202 may receive invoices from 1, 2, 5, 10, 50, 100, 1,000 or more vendors. The vendors may provide the invoices to the procurement entity daily, weekly, monthly, quarterly, semi-annually, annually or on any other suitable schedule or on no schedule at all.

Apparatus 300 may include billing event descriptor normalization engine 304. Billing event descriptor normalization engine 304 may receive billing reference information from a vendor billing reference guide. Billing event descriptor normalization engine 304 may map the billing reference information into data structures in a billing event record such as 100 (shown in FIG. 1). For example, billing event descriptor normalization engine 304 may map billing reference information into billing event descriptor data 104.

Billing event descriptor normalization engine 304 may receive billing reference information from a vendor billing reference guide. Billing event descriptor normalization engine 304 may map the billing reference information into data structures in a billing event record such as 100 (shown in FIG. 1). For example, billing event descriptor normalization engine 304 may map billing reference information into billing event descriptor data 104.

Billing event descriptor normalization engine 304 may join to the billing event record billing event attribute data. For example, billing event descriptor normalization engine 304 may map billing event attribute data to billing event attribute data 106.

The procuring entity may use billing event attribute data 106 to categorize the event record. This may be helpful if the billing event identifier or the billing event descriptor do not lend themselves to a desired categorization.

Apparatus 300 may include procurement entity data server 306. Procurement entity data server 306 may identify one or more procuring entity constituent descriptors that correspond to a procurement entity constituent identifier. The procurement entity constituent identifier may be extracted from invoice data 102. Procurement entity data server 306 may join to the billing event record one or more procuring entity constituent descriptors that correspond to the procurement entity constituent identifier.

Apparatus 300 may include anomalous billing event correlation engine 308. Anomalous billing event correlation engine 308 may populate all or some of a billing event record such as 100 (shown in FIG. 1) when invoice normalization engine 302 receives an anomalous billing event identifier.

The anomalous billing event identifier may be a billing identifier for which billing event descriptor normalization engine 304 does not have, or cannot identify, or cannot adequately identify a billing event descriptor.

Anomalous billing event correlation engine 308 may identify a provisional billing event descriptor corresponding to the anomalous billing event identifier. Invoice normalization engine 302 may join the anomalous billing event identifier to a billing event record such as billing event record 100 (shown in FIG. 1). Anomalous billing event correlation engine 308 may join the provisional billing event descriptor to the billing event record. Anomalous billing event record may join an anomalous billing event identifier flag to the billing event record. The flag may be included in billing event descriptor data 106 (shown in FIG. 1).

Apparatus 300 may include accounting general ledger interface 310. Accounting general ledger interface 310 may perform accounting operations on a set of billing event records such as 100 (shown in FIG. 1). Accounting general ledger interface 310 may aggregate the billing records into groups that may be defined by one or more fields of the billing event records. For example, disparate billing events that have a common billing event descriptor may be treated as a distinct group of records. Billing events that have a common procuring entity constituent descriptor may be treated as a distinct group of records.

Accounting general ledger interface 310 may provide any general ledger tools. The tools may include any suitable cost management tools. The tools may operate on each billing event record as an individual record. The tools may operate on each group of billing event records as an individual "record." Table 4 lists illustrative cost management tools and illustrative reports.

TABLE 4

Illustrative cost management tools and illustrative reports.

| Illustrative Cost Management Tools | Illustrative description |
|---|---|
| Vendor invoice data extraction | Outputs raw invoice data |
| Cost summary | Summarizes billing event costs |
| Expense/opportunity identification | Shows changes in costs between time periods; descriptive statistics, including, e.g., mean, standard deviation, variance to identify temporal changes, outliers, etc. |
| Trend analysis | Shows temporal changes in costs, regularity of billing cycles, identifies irregular billing cycles. |
| Vendor price change analysis | Projects changes in costs based upon hypothetical or projected changes in vendor billing event prices |
| Inter-vendor price comparison | Compares costs of similar billing events provided by different vendors |
| Efficiency and opportunity analysis | For example, a cost-benefit analysis of a practice such as subjecting transactions to a security measure, such as a fraud check, or the identification of a dollar-value (or other currency value) below which the security measure is uneconomical |

Apparatus 300 may include reporting engine 312. Reporting engine 312 may provide output based on the cost management tools. When reporting engine 312 provides a report based on billing event groups, reporting engine 312 may provide a user with the ability to view (or "drill-down" to) the billing event records that are in the group.

Processes in accordance with the principles of the invention may include one or more features of the processes illustrated in FIGS. 4-18. For the sake of illustration, the steps of the illustrated processes will be described as being performed by a "system." The "system" may include one or more of the features of the apparatus that are shown in FIGS. 1-2 and/or any other suitable device or approach. The "system" may be provided by an entity. The entity may be an individual, an organization or any other suitable entity.

Figure 4:
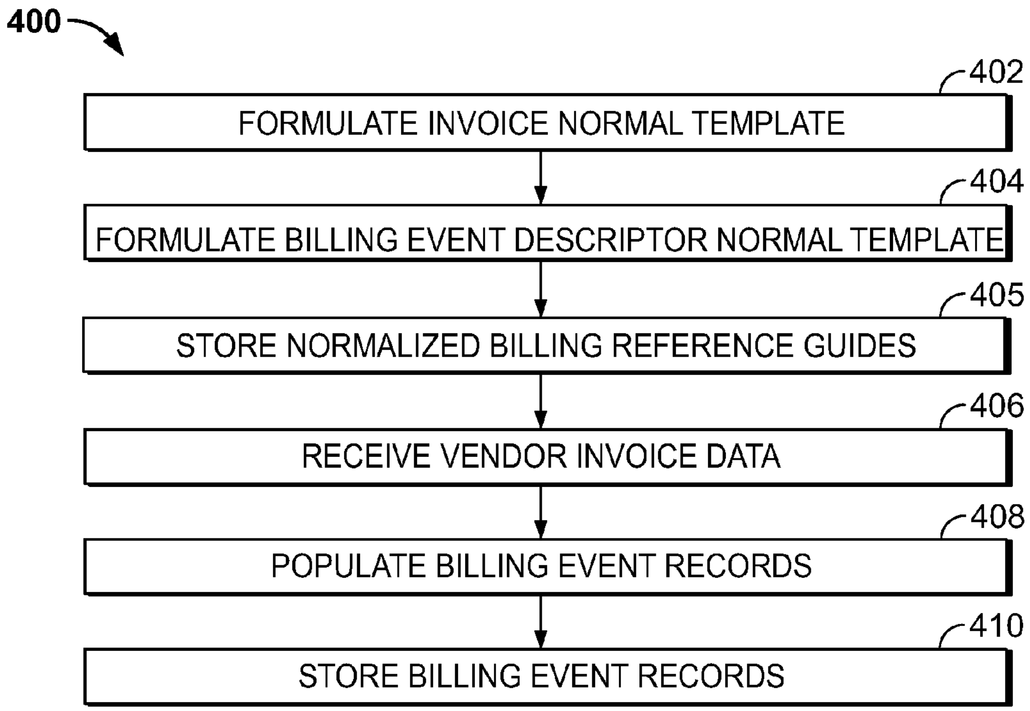
FIG. 4 shows illustrative elements of another process in accordance with the principles of the invention.

FIG. 4 shows illustrative process 400. Process 400 may begin at step 402. At step 402, the system may formulate an invoice normal template. The invoice normal template may define fields in segment 110 of billing event record 100 (shown in FIG. 1). The invoice normal template may define a mapping between a vendor invoice and the fields. Different vendors may have different mappings so that different invoice data from the different vendors may be mapped into the billing event record.

At step 404, the system may formulate a billing event descriptor normal template. The billing event descriptor normal template may define fields in segments 112 and 114 of billing event record 100 (shown in FIG. 1). The billing event descriptor normal template may define a mapping between a vendor billing reference guide and the fields. Different vendors may have different mappings so that different billing reference guides may be mapped into the billing event record.

At step 405, the system may store, for each vendor billing reference guide, a normalized billing reference guide that is defined by the mapping of step 404.

At step 406, the system may receive vendor invoice data from one or more vendor invoices.

At step 408, the system may create and populate a billing event record such as record 100 (shown in FIG. 1) for each billing event in the invoices. The system may populate the billing event records based on the mappings from steps 402 and 404. The system may populate segment 110 of each record based in whole or in part on invoice data. The system may populate segment 112 of each record based in whole or in part on vendor billing reference guide information. The system may populate segment 114 of each record based in whole or in part on billing event attribute data. The system may populate segment 116 of each record based in whole or in part on procuring entity descriptor data.

At step 410, the system may store the billing event records. The records may be stored for use with general ledger interface 310, reporting engine 312 or any other suitable data processing tool.

FIG. 5 shows illustrative invoice normal template 500. Invoice normal template 500 may be formulated in step 402 of process 400 (shown in FIG. 4). Invoice normal template 500 may include field numbers 502. Invoice normal template 500 may include fields 504. Fields 504 may be the fields in segment 110 of billing event record 100 (shown in FIG. 1). Field numbers 502 may be used to map invoice data from an invoice number into segment 110 of billing event record 100.

Table 5 lists illustrative explanations of fields 504.

TABLE 5

Illustrative explanations of fields 504.

| Field Number (502) | Field (504) | Explanation |
|---|---|---|
| 1 | Billing event number | Code representing service that was rendered by vendor to procuring entity |
| 2 | Service code | Vendor classification for service rendered by vendor to procuring entity |
| 3 | Description | Narrative description of service |
| 4 | Vendor | Name of vendor that rendered service |
| 5 | Rate type | Classification of rate that was applied to the service (for example: quantity, volume-tiered, flat rate, etc.) |
| 6 | Unit of measuring code | Code corresponding to units of measure (for example: quantity ("each"), volume, weight, duration) |
| 7 | Units | Unit of measure of service provided (e.g., units, pounds, gallons, units of time) |
| 8 | Rate | Amount of currency charged per unit of service required |
| 9 | Sub-total | Product of units and rate |
| 10 | Tax | Tax applicable to service provided |
| 11 | Total incl. tax | Total charge, including sub-total and tax |
| 12 | Invoice number | Vendor identifier corresponding to the invoice |
| 13 | Procuring entity constituent identifier | Identifier that vendor uses to identify the constituent, within the procuring entity, to whom the service provided |
| 14 | Invoice date | Date upon which the invoice was closed |
| 15 | Year-month | Portion of invoice date |
| 16 | Vendor description | Procuring entity description of vendor |
| 17 | Invoice tracking number | Procuring entity identifier corresponding to the invoice |
| 18 | Payment type | Vendor-accepted method of payment (e.g., wire, check, credit card, etc.) |
| 19 | Currency | Vendor-accepted currency for payment of charges on invoice |
| 20 | Archive date | Date on which procuring entity stored invoice data or image of invoice |
| 21 | Comments | Procuring entity comments |
| 22 | Adjustment | Amount of reduction of total charges on invoice |

The system may populate some fields of segment 110 based on other fields. For example, an invoice may include an invoice date, but not an invoice year-month. The system may calculate the year-month based on the date. The system may populate some fields of segment 110 based on information in the system's memory or based on user input. For example, the system may populate the invoice tracking number field based on the system's knowledge of tracking numbers for historically received invoices.

For the sake of illustration, some principles of the invention will be described using a hypothetical procuring entity that procures transportation services from different transportation services vendors.

FIG. 6 shows illustrative invoice 600. FIG. 6 shows circled field numbers that map invoice 600 fields to field numbers 502 of invoice normal template 500 (shown in FIG. 5). Table 6 shows the mapping of fields from invoice 600 to invoice normal template 500.

TABLE 6

Mapping of Fields From Invoice 600 to Invoice Field Numbers 502 Normal Template 500.

| Invoice 600 Field Name | Field Number (502) | Illustrative Value of Invoice 600 Field |
|---|---|---|
| Vendor Name | 4 | Vendor 1 |
| Invoice No. | 12 | XXXX1001 |
| Currency | 19 | USD (U.S. Dollars) |
| Billing Cycle Date | 14 | Jan. 31, 2011 |
| Item | 1 | EEEE111 |
| Description Sub-Field 3 | 3 | Parcel |
| Description Sub-Field 7 | 5 | GW (Gross Weight) |
| Description Sub-Field 8 | 6 | LBS (Pounds) |
| Quantity | 7 | 314 |
| Rate | 8 | 6.29 |
| Subtotal | 9 | $1,975.06 |
| Tax | 10 | $ 132.33 |
| Total | 11 | $2,107.39 |
| Collection Method | 18 | WT (Wire Transfer) |
| Billable Customer | 13 | CCCCC102 |
| Service Code | 2 | LS (Logistical Services) |

Invoice 600 may thus be mapped into a billing event record such as 100 (shown in FIG. 1).

Figure 7:
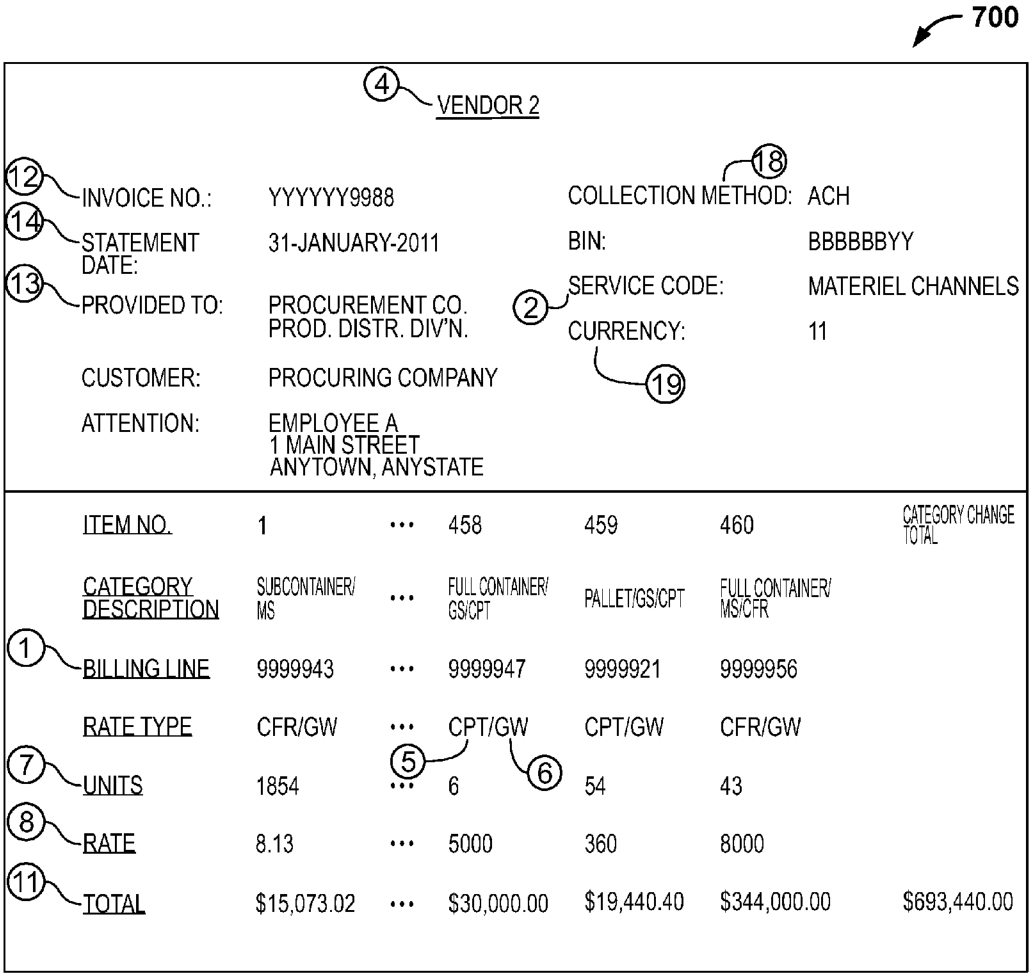
FIG. 7 shows still other illustrative information in accordance with the principles of the invention.

FIG. 7 shows illustrative invoice 700. Invoice 700 includes data that may be similar to, but in a different from, the data of invoice 600 (shown in FIG. 6). FIG. 7 shows circled field numbers that map invoice 700 fields to field numbers 502 of invoice normal template 500 (shown in FIG. 5). Table 7 shows the mapping of fields from invoice 700 to invoice normal template 500.

TABLE 7

Mapping of Fields From Invoice 700 to Invoice Field Numbers 502 Normal Template 500.

| Invoice 700 Field Name | Field Number (502) | Illustrative Value of Invoice 700 Field |
|---|---|---|
| Vendor Name | 4 | Vendor 2 |
| Invoice No. | 12 | YYYYYY9988 |
| Currency | 19 | 011 (U.S. Dollars) |
| Statement Date | 14 | Jan. 31, 2011 |
| Category Description | 3 | Subcontainer, marine surface |
| Billing Line | 1 | 9999943 |
| Rate Type Sub-Field 1 | 5 | CFR (Cost and Freight) |
| Rate Type Sub-Field 2 | 6 | LBS (Pounds) |
| Units | 7 | 1854 |
| Rate | 8 | 8.13 |
| Total | 11 | $ 15,073.02 |
| Collection Method | 18 | EFT (Electronic Fund Transfer) |
| Billable Customer | 13 | Procurement Co. Products Distribution Division |
| Service Code | 2 | MC (Materiel Channels) |

Invoice 700 may thus be mapped into a billing event record such as 100 (shown in FIG. 1).

FIG. 8 shows illustrative billing event descriptors normal template 800. Billing event descriptors normal template 800 may be formulated in step 404 of process 400 (shown in FIG. 4). Billing event descriptors normal template 800 may include descriptor numbers 802. Billing event descriptors normal template 800 may include fields 504. Fields 804 may be the fields in segment 112 of billing event record 100 (shown in FIG. 1). Descriptor numbers 502 may be used to map billing event descriptors from a vendor billing reference guide information into 112 of billing event record 100.

Billing event descriptors normal template 800 may include valid values 806.

Table 8 lists illustrative explanations of fields 804 and illustrative origins of information that may be used to populate fields 804.

TABLE 8

Illustrative Explanations of Fields 804 and Illustrative Origins of Information That May Be Used to Populate Fields 804.

| Descriptor Number (802) | Field (804) | Explanation | Origin V = Vendor PE = Procuring Entity |
|---|---|---|---|
| 1 | Billing Event Identifier | Identifies a service provided | V |
| 2 | Billing Event Short Number | Abbreviated billing event identifier | V |
| 3 | Vendor Summary Description | General category of billing event | V |
| 4 | Service Description | Functional description of billing event | V |
| 5 | Detailed Description | Detailed billing event description of billing event | V or PE |
| 6 | Procuring entity Category | Procuring entity categorization of vendor billing event by function | PE |
| 7 | Procuring entity constituent identifier | Identifies procuring entity constituent that acquired the service | V or PE |
| 8 | Type | Type of transaction between parties (e.g., contract, on request, etc.) | V or PE |
| 9 | Frequency | Indicator of how often invoices are received and processed | V or PE |
| 10 | Point of Interaction (POI) | Where and method transaction occurred | V or PE |
| 11 | Account Number | General ledger account the billing event will post | V |
| 12 | Offset Account | Offset general ledger account number | V |
| 13 | Driver | Billing event is directly tied to (D)ollar volume or (T)ransaction volume | V or PE |
| 14 | Date of Update | General record maintenance date | V |
| 15 | Date Billing Entry Added | Initial entry date of billing event | V |
| 16 | Date billing Entry Changed | Billing event change date | V |

TABLE 8-continued

Illustrative Explanations of Fields 804 and Illustrative Origins of Information That May Be Used to Populate Fields 804.

| Descriptor Number (802) | Field (804) | Explanation | Origin V = Vendor PE = Procuring Entity |
|---|---|---|---|
| 17 | Comments | General comments | V or PE |
| 18 | Procuring entity Category2 | General categorization by procuring entity | V |
| 19 | Date of Change of category | Date of change of category | V |
| 20 | Category3 | General categorization by procuring entity | V |
| 21 | Date of Change of category | Date of change of category | V |
| 22 | Adjustments | Billing adjustments made by procuring entity | V |
| 23 | Procuring entity treatment | Billing event is considered "primary;" "secondary;" or "tertiary" in relation to the acquisition or provision of a service (e.g., delivery of a product = "primary;" over-dimension fee = "secondary;" port fee = "tertiary") | PE |
| 24 | Treatment description | Discretionary description provided by vendor | V |
| 25 | Date of Change of treatment | Date of change of treatment | V or PE |
| 26 | Share Services | Vendor supplies competitors with same billing event (Y/N) | PE |
| 27 | Service indicator | If billing event is a shared service, type of service as defined by procuring entity | PE |
| 28 | Service Type | Association of a service with a class that is defined by procuring entity | PE |
| 29 | Sending Receiving | Billing event is categorized based on procuring entity's role as "sending" or "receiving" | V or PE |
| 30 | Service Indicator Comments | General comments | V |
| 31 | Request for Proposal Categories | General categorization list set internally | V |
| 32 | Change in Request for Proposal Categories | General categorization list set internally | V |
| 33 | Domestic/ International | Originating country of procurement vendor billing | V or PE |

The system may populate some fields of segment 112 based on other fields. For example, a vendor billing reference guide may include a detailed description (Descriptor No. 5). The system may identify a procuring entity category (Descriptor No. 6) based on the detailed description. The system may populate some fields of segment 112 based on information in the system's memory or based on user input.

The system may populate fields of a billing event record segment 116 with procuring entity constituent information such as that shown in Table 3.

FIGS. 9A and 9B shows illustrative vendor billing reference guide 900 for Vendor 1. FIG. 6 shows circled field numbers that map vendor billing reference guide 900 fields to descriptor numbers 802 (shown in FIG. 8) of vendor billing reference guide 900. Table 9 shows the mapping of fields from vendor billing reference guide 900 to billing event descriptors normal template 800. The system may store for Vendor 1 a normalized billing reference guide based on the mapping.

TABLE 9

Mapping of fields from vendor billing reference guide 900 to billing event descriptors normal template 800.

| Vendor Billing Reference Guide 900 Field Name | Descriptor Number (802) | Illustrative Value of Vendor Billing Reference Guide 900 Field |
|---|---|---|
| Billing Item | 1 | EEEE101 |
| Item Type | 3 | Parcel Shipment |
| Item Type Description | 5 | Ground Truck Expedited In-Country |

Vendor billing reference guide 900 may thus be mapped into a billing event record such as 100 (shown in FIG. 1).

Table 10 shows a portion of a normalized billing reference guide for Vendor 1 based on the application of billing event descriptors normal template 800 to Vendor 1 billing reference guide 900.

TABLE 10

Illustrative Portion of Normalized Billing Reference Guide for Vendor 1.

| Descriptor 1 Billing Event Identifier | Descriptor 2 Billing Event Short Number | Descriptor 3 Vendor Summary Description | Descriptor 4 Service Description | Descriptor 5 Detailed Description | Descriptor 6 Procuring Entity Category |
|---|---|---|---|---|---|
| EEEE101 | 101 | Parcel Shipment | N/A | Ground Truck Expedited In-country | Local Retail |
| EEEE102 | 102 | Parcel Shipment | N/A | Ground Truck Expedited Customs | Foreign Retail |
| EEEE103 | 103 | Parcel Shipment | N/A | Ground Truck Regular In-country | Local Retail |
| EEEE104 | 104 | Parcel Shipment | N/A | Ground Truck Regular Customs | Foreign Retail |
| EEEE105 | 105 | Parcel Shipment | N/A | Ground Rail Expedited In-country | Local Retail |
| EEEE106 | 106 | Parcel Shipment | N/A | Ground Rail Expedited Customs | Foreign Retail |
| EEEE107 | 107 | Parcel Shipment | N/A | Ground Rail Regular In-country | Local Retail |
| EEEE108 | 108 | Parcel Shipment | N/A | Ground Rail Regular Customs | Foreign Retail |
| EEEE109 | 109 | Parcel Shipment | N/A | Air Expedited In Country | Local Retail |
| EEEE110 | 110 | Parcel Shipment | N/A | Air Expedited In Customs | Foreign Retail |
| EEEE111 | 111 | Parcel Shipment | N/A | Sea Expedited In-country | Local Retail |
| EEEE112 | 112 | Parcel Shipment | N/A | Sea Expedited Customs | Foreign Retail |

TABLE 10-continued

Illustrative Portion of Normalized Billing Reference Guide for Vendor 1.

| Descriptor 1 Billing Event Identifier | Descriptor 2 Billing Event Short Number | Descriptor 3 Vendor Summary Description | Descriptor 4 Service Description | Descriptor 5 Detailed Description | Descriptor 6 Procuring Entity Category |
|---|---|---|---|---|---|
| EEEE113 | 113 | Pallet Shipment | N/A | Ground Truck Expedited In-country | Local Special |
| EEEE114 | 114 | Pallet Shipment | N/A | Ground Truck Expedited Customs | Foreign Special |
| EEEE115 | 115 | Pallet Shipment | N/A | Ground Truck Regular In-country | Local Special |
| EEEE116 | 116 | Pallet Shipment | N/A | Ground Truck Regular Customs | Foreign Special |
| EEEE117 | 117 | Pallet Shipment | N/A | Ground Rail Expedited In-country | Local Special |
| EEEE118 | 118 | Pallet Shipment | N/A | Ground Rail Expedited Customs | Foreign Special |
| EEEE119 | 119 | Pallet Shipment | N/A | Ground Rail Regular In-country | Local Special |
| EEEE120 | 120 | Pallet Shipment | N/A | Groud Rail Regular Customs | Foreign Special |
| EEEE121 | 121 | Pallet Shipment | N/A | Air Expedited In Country | Local Special |
| EEEE122 | 122 | Pallet Shipment | N/A | Air Expedited Customs | Foreign Special |
| EEEE123 | 123 | Pallet Shipment | N/A | Sea Expedited In-country | Local Special |
| EEEE124 | 124 | Pallet Shipment | N/A | Sea Expedited Customs | Foreign Special |
| EEEE125 | 125 | Container Shipment | N/A | Ground Truck Expedited In-country | Local House Brand Wholesale |
| EEEE126 | 126 | Container Shipment | N/A | Ground Truck Expedited Customs | Foreign House Brand Wholesale |
| EEEE127 | 127 | Container Shipment | N/A | Ground Truck Regular In-country | Local House Brand Wholesale |
| EEEE128 | 128 | Container Shipment | N/A | Ground Truck Regular Customs | Foreign House Brand Wholesale |
| EEEE129 | 129 | Container Shipment | N/A | Ground Rail Expedited In-country | Local House Brand Wholesale |
| EEEE130 | 130 | Container Shipment | N/A | Ground Rail Expedited Customs | Foreign House Brand Wholesale |
| EEEE131 | 131 | Container Shipment | N/A | Ground Rail Regular In-country | Local House Brand Wholesale |

TABLE 10-continued

Illustrative Portion of Normalized Billing Reference Guide for Vendor 1.

| Descriptor 1 Billing Event Identifier | Descriptor 2 Billing Event Short Number | Descriptor 3 Vendor Summary Description | Descriptor 4 Service Description | Descriptor 5 Detailed Description | Descriptor 6 Procuring Entity Category |
|---|---|---|---|---|---|
| EEEE134 | 134 | Container Shipment | N/A | Air Expedited Customs | Foreign House Brand Wholesale |
| EEEE135 | 135 | Container Shipment | N/A | Sea Expedited In-country | Local House Brand Wholesale |
| EEEE136 | 136 | Container Shipment | N/A | Sea Expedited Customs | Foreign House Brand Wholesale |
| EEEE137 | 137 | Oversized Cargo | N/A | Ground Truck Expedited In-country | Custom Project domestic |
| EEEE138 | 138 | Oversized Cargo | N/A | Ground Truck Expedited Customs | Custom Project Internat'l |
| EEEE139 | 139 | Oversized Cargo | N/A | Ground Truck Regular In-country | Custom Project domestic |
| EEEE140 | 140 | Oversized Cargo | N/A | Ground Truck Regular Customs | Custom Project Internat'l |
| EEEE141 | 141 | Oversized Cargo | N/A | Ground Rail Expedited In-country | Custom Project domestic |
| EEEE142 | 142 | Oversized Cargo | N/A | Ground Rail Expedited Customs | Custom Project Internat'l |
| EEEE143 | 143 | Oversized Cargo | N/A | Ground Rail Regular In-country | Custom Project domestic |
| EEEE144 | 144 | Oversized Cargo | N/A | Ground Rail Regular Customs | Custom Project Internat'l |
| EEEE145 | 145 | Oversized Cargo | N/A | Air Expedited In Country | Custom Project domestic |
| EEEE146 | 146 | Oversized Cargo | N/A | Air Expedited Customs | Custom Project Internat'l |
| EEEE147 | 147 | Oversized Cargo | N/A | Sea Expedited In-country | Custom Project domestic |
| EEEE148 | 148 | Oversized Cargo | N/A | Sea Expedited Customs | Custom Project Internat'l |
| EEEE149 | 149 | Reporting | N/A | Item Tracking-Individual | Domestic Reporting |
| EEEE150 | 150 | Reporting | N/A | Item Tracking-Project | Internat'l Reporting |
| EEEE151 | 151 | Project Design | N/A | Manifest Co-ordination In-country | Domestic Custom Project Design |
| EEEE152 | 152 | Project Design | N/A | Manifest Co-ordination Customs | Internat'l Custom Project Design |

FIGS. 10A and 10B shows illustrative vendor billing reference guide 1000 for Vendor 2. FIGS. 10A and 10B shows circled field numbers that map vendor billing reference guide 1000 fields to descriptor numbers 802 (shown in FIG. 8) of vendor billing reference guide 1000. Table 11 shows the mapping of fields from vendor billing reference guide 1000 to billing event descriptors normal template 800. The system may store for Vendor 2 a normalized billing reference guide based on the mapping.

TABLE 11

Mapping of fields from vendor billing reference guide 1000 to billing event descriptors normal template 800.

| Vendor Billing Reference Guide 1000 Field Name | Descriptor Number (802) | Illustrative Value of Vendor Billing Reference Guide 1000 Field |
|---|---|---|
| Service | 1 | FFF909 |
| Service Type | 3 | Package Shipment |
| Detail | 5 | Domestic Trailer Expedited |

Vendor billing reference guide 1000 may thus be mapped into a billing event record such as 100 (shown in FIG. 1).

Figure 11:
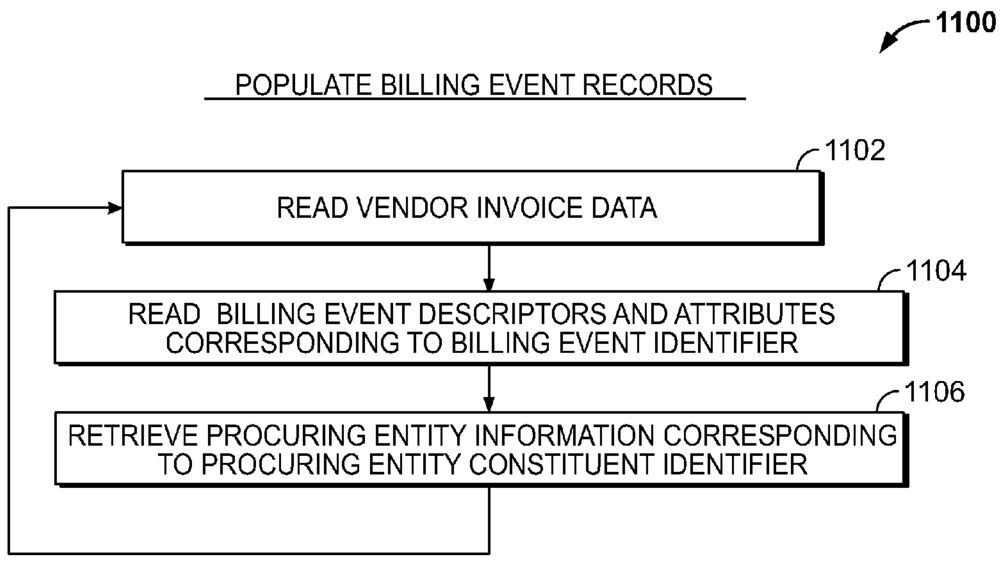
FIG. 11 shows illustrative elements of yet another process in accordance with the principles of the invention.

FIG. 11 shows illustrative process 1100. The system may execute one or more of the steps of process 1100 in connection with the execution of step 408 of process 400 (shown in FIG. 4).

Process 1100 may begin at step 1102. At step 1102, the system may read vendor invoice data from a vendor invoice. The system may map some or all of the invoice data into a billing event record such as billing event record 100 (shown in FIG. 1). The invoice data may include a billing event identifier. At step 1104, the system may read, from a vendor billing reference guide, billing event descriptors that correspond to the billing event identifier. The system may map some or all of the billing reference guide event descriptors into the billing event record. The billing event descriptors may include a procuring entity constituent identifier.

The system may map billing event attribute data into the billing event record.

At step 1106, the system may retrieve, from a table of procuring entity constituents, procuring entity descriptor data that correspond to the procuring entity constituent identifier. The system may map some or all of the procuring entity descriptor data into the billing event record.

The system may recursively repeat steps 1102-1106 to read lines of data from one or more invoices from one or more vendors. The system may create a new billing record such as 100 (shown in FIG. 1) for each recursion of process 1100.

Figure 12:
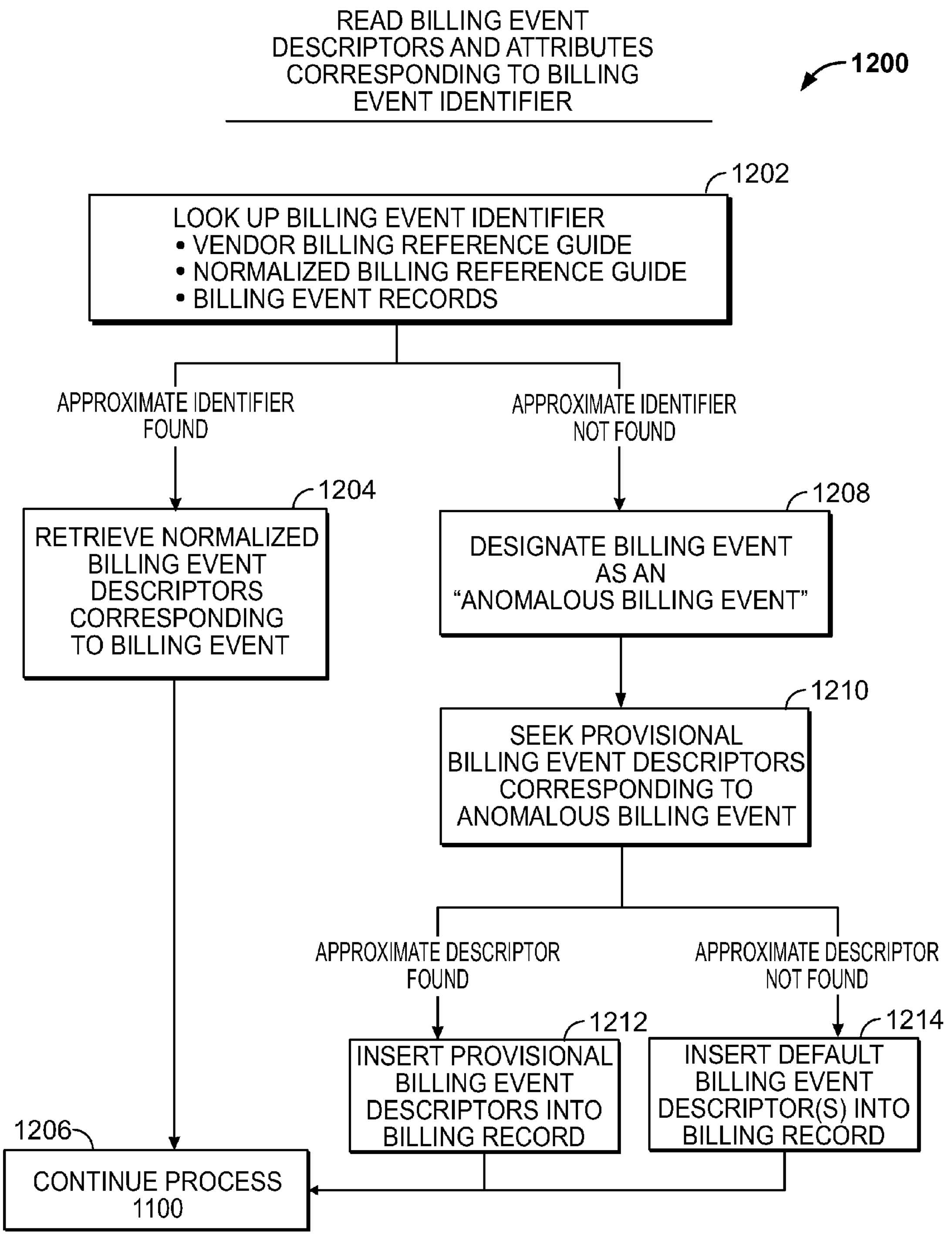
FIG. 12 shows illustrative elements of still another process in accordance with the principles of the invention.

FIG. 12 shows illustrative process 1200. The system may execute one or more of the steps of process 1200 in connection with the execution of step 1104 of process 1100 (shown in FIG. 11).

Process 1200 may begin at step 1202. At step 1202, the system may seek in a vendor billing reference guide, a normalized billing reference guide (such as a normalized billing reference guide stored in step 405, shown in FIG. 4) or a billing event record data set a billing event identifier for which billing event descriptors and attributes are required. If the billing event identifier is found, process 1200 may continue at step 1204.

At step 1204, the system may retrieve from a normalized billing reference guide billing event descriptors (such as those in fields 804, shown in FIG. 8) that correspond to the billing event identifier. The billing event descriptors may then be inserted into the billing event record for the billing event identifier.

At step 1206, the system may return control to process 1100 (shown in FIG. 11).

If at step 1202, the billing event identifier is not found, process 1200 may continue at step 1208. At step 1208, the system may designate the billing event as an "ANOMALOUS BILLING EVENT." The system may do so by setting a flag in billing event attribute data 106 (shown in FIG. 1).

At step 1210, the system may seek in a vendor billing reference guide, a normalized billing reference guide (such as a normalized billing reference guide stored in step 405, shown in FIG. 4) or a billing event record data set one or more provisional billing event descriptors that approximately correspond to the anomalous billing event.

If the provisional billing event descriptor is found, process 1200 may continue at step 1212. At step 1212, the system may retrieve the provisional billing event descriptor or descriptors and insert them into the billing event record. Process 1200 may continue at step 1206. At step 1206, the system may return control to process 1100 (shown in FIG. 11).

If at step 1210 the provisional billing event descriptor is not found, process 1200 may continue at step 1214. At step 1214, the system may insert one or more default billing event descriptors into the billing record. Process 1200 may continue at step 1206.

Figure 13:
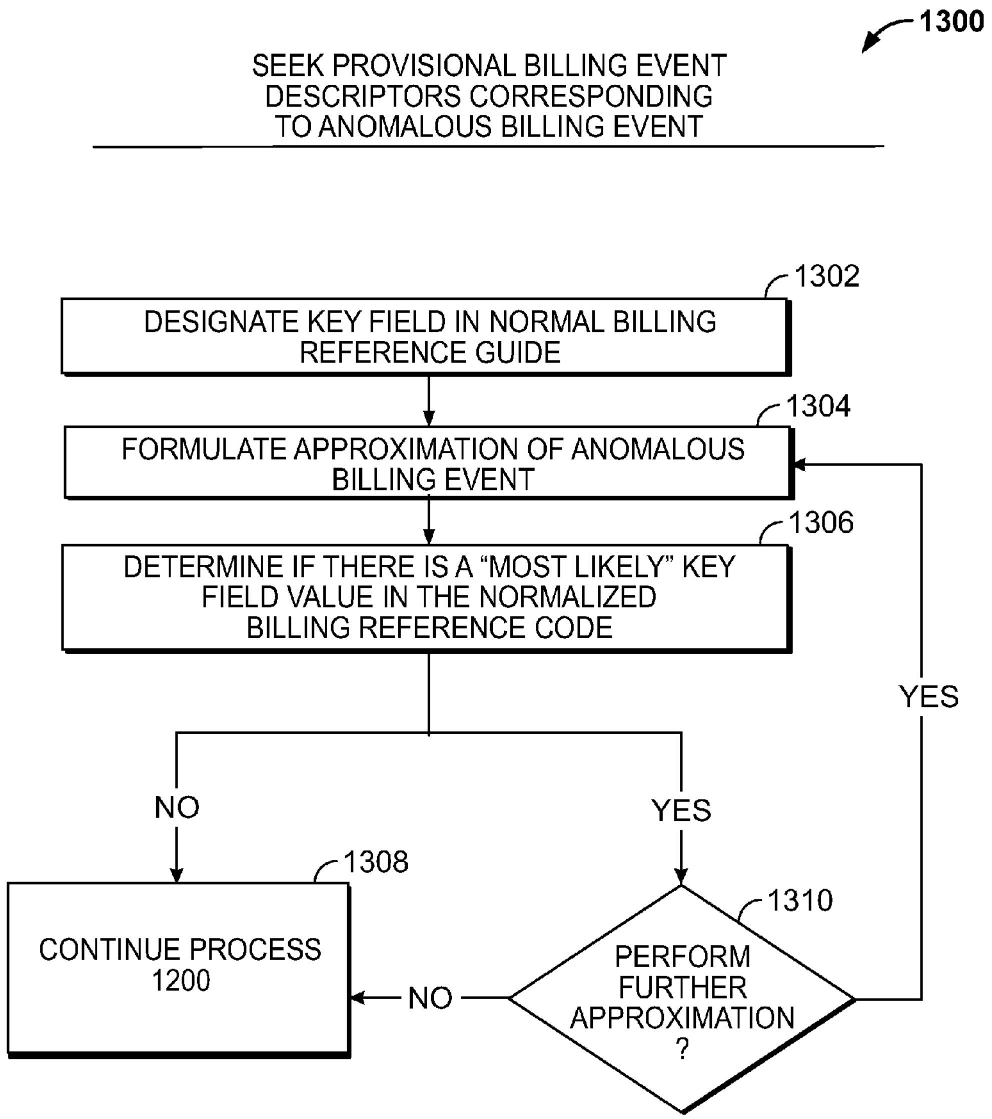
FIG. 13 shows illustrative elements of still another process in accordance with the principles of the invention.

FIG. 13 shows illustrative process 1300. The system may execute one or more of the steps of process 1300 in connection with the execution of step 1210 of process 1200 (shown in FIG. 12).

Process 1300 may begin at step 1302. At step 1302, the system may be used to designate a key field of a normalized billing reference guide. The key field may be a field of the normalized billing reference guide that is to be approximately matched to the anomalous billing event. For example, the key field may be the billing event identifier field. (See, e.g., descriptor number 1 (field 802) in template 800 (shown in FIG. 8), which is normalized as a billing identifier in field 804.) The anomalous billing event identifier may thus be approximately matched to billing event identifiers in the normalized billing reference manual.

(In another illustrative example, the system may be used to designate as a key field the vendor summary description field. (See, e.g., descriptor number 3 (field 802) in template 800 (shown in FIG. 8), which is normalized as a vendor summary description.) In such an example invoice data, such as textual data, like "description," may be matched to the key field. (See, e.g., invoice field number 3 (field 502) in template 500 (shown in FIG. 5), which is normalized as "description."))

Any invoice data may be selected for matching to any key field data.

At step 1304, the system may formulate an approximation of the anomalous billing event. The approximation may be a derivative that is derived from a field in the invoice data. For example, the derivative may be a truncation of the anomalous billing event identifier, a text selection from a different field, such as "description," that corresponds to the anomalous billing event identifier, or any other suitable sample or index from the invoice data that corresponds to the anomalous billing event identifier.

At step 1306, the system may determine if there is a "most likely" descriptor in the normalized billing reference guide based on a selected invoice data field and the selected normalized billing reference guide key field.

The system may find candidate key fields in the normalized billing reference guide that correspond to the derivative. The correspondence may be determined by similarity of characters, closeness of multivariate clusters or any other suitable index of closeness.

If at step 1306 a most likely candidate is found, the system may at step 1308 return control to process 1200 (shown in FIG. 12) at step 1212.

If at step 1306 a most likely candidate is not found, process 1300 may continue at step 1310. At step 1310, the system may decide if further approximation should be made. The further approximation may involve broadening the derivative billing event identifier so that the derivative will correspond to a greater variety of candidate key field values. The further approximation may involve relaxing an objective criteria for designating key field values as candidates. If at step 1310, the system decides to perform further approximation, process 1300 may return to step 1304.

If at step 1310, the system decides not to perform further approximation, process 1300 may at step 1308 return control to process 1200 (shown in FIG. 12) at step 1214. A decision to not perform further approximation may be based on an objective index. The objective index may be a constant indicating a maximum number of approximations. The objective may be an index of a rate of convergence upon a most likely key field value. The system may be configured to use one or more different analytical measures of closeness with subsequent returns to step 1304. The system may be configured to stop returning to step 1304 after one or more analytical approaches for quantifying closeness fails to identify a most likely key field value.

FIG. 14 shows an illustrative portion 1400 of a billing event record database. The billing event record database may include records of billing events such as billing event record 100 (shown in FIG. 1). The billing event record database may be assembled from the billing event records by using a process such as process 1100 (shown in FIG. 11).

Records in the billing event record database may be based on the structure of, invoice data from invoices such as 600 (shown in FIGS. 6) and 700 (shown in FIG. 7), invoice normal template 500 (shown in FIG. 5), Vendor 1 billing reference guide 900 (shown in FIGS. 9A and 9B), Vendor 2 billing reference guide 1000 (shown in FIGS. 10A and 10B) and billing event descriptors normal template 800 (shown in FIG. 8).

Field 1402 may include a procuring entity system record ID. The procuring entity system may assign to each of the billing event records a system record ID. The system record ID may be a unique identification number.

Field 1404 may identify the vendor from which came the billing event upon which each record is based. All of the records shown in database 1400 are from Vendor 1, but a different portion of database 1400 may include records based on billing events from one or more different vendors.

Field 1406 shows a billing event identifier that corresponds to descriptor number 1 in field 802 of billing event descriptors normal template 800 (shown in FIG. 8).

Field 1408 shows a vendor summary description that corresponds to descriptor number 3 in field 802 of billing event descriptors normal template 800 (shown in FIG. 8).

Field 1410 shows a detailed description that corresponds to descriptor number 5 in field 802 of billing event descriptors normal template 800 (shown in FIG. 8).

Field 1412 shows a procuring entity category that corresponds to descriptor number 6 in field 802 of billing event descriptors normal template 800 (shown in FIG. 8).

Field 1416 shows an anomalous billing event flag that may be set in step 1208 of process 1200 (shown in FIG. 12). For the sake of illustration, the value "1" indicates an anomalous billing event. The anomalous billing event is in record 10,990, 103. The anomalous billing event identifier is EEE13X, which does not appear in Vendor 1 billing reference guide 900 (shown in FIGS. 9A and 9B).

The system may formulate a derivative billing event identifier by truncating the anomalous billing event identifier ("EEE13X"). The derivative billing event identifier would be "EEE13."

FIG. 15 shows illustrative query results 1500 from the billing event records database. Field 1502 shows derivative billing event identifier "EEE13," which is the basis of the query that produced results 1500.

Field 1504 shows detailed descriptions that correspond to the derivative billing event identifier.

Field 1506 shows procuring entity categories that correspond to the derivative billing event identifier.

FIG. 16 shows illustrative count data 1600. Count data 1600 may be based on a selection in step 1302 (of process 1300, shown in FIG. 13) of the detailed description field (Descriptor 5 in billing event descriptors normal template 800) as the key field for selecting a candidate billing event descriptor. Field 1602 shows counts of occurrences of the detailed descriptions from query results 1500. Field 1602 shows a count of "1" for each of the detailed descriptions in query results 1500. In such a scenario, the system may, at step 1310 of process 1300 (shown in FIG. 13) decide to perform further approximation. For example, the system may decide to use a different key field.

FIG. 17 shows illustrative count data 1700. Count data 1700 may be based on a selection in step 1302 (of process 1300, shown in FIG. 13) of the procuring entity category (Descriptor 6 in billing event descriptors normal template 800) as the key field for selecting a candidate billing event descriptor. Field 1702 shows counts of occurrences of the detailed descriptions from query results 1500. Field 1702 shows counts of "3" for the procuring entity category "Foreign House Brand Wholesale," "2" for "Local House Brand Wholesale," "2" for "Custom Project Domestic" and "1" for "Custom Project International."

The system may identify "Foreign House Brand Wholesale" as the most likely descriptor for derivative billing event identifier "EEE13" and, thus, for anomalous billing event identifier "EEE13X".

FIG. 18 shows illustrative portion 1800 of the billing event record database. Database portion 1800 corresponds to database portion 1400 (shown in FIG. 14) after the identification of "Foreign House Brand Wholesale" as the most likely descriptor for anomalous billing event identifier "EEE13X". Fields 1802, 1804, 1806, 1808, 1810, 1812 and 1814 correspond to fields 1402, 1404, 1406, 1408, 1410, 1412 and 1414, respectively, of database portion 1400. The value of anomalous Billing Event Flag 1814 may remain "1" to indicate that "Foreign House Brand Wholesale" is a provisional billing event descriptor. The system may be used to generate reports of billing event records that include provisional descriptors. The reports may be used to confirm or disconfirm the accuracy of the provisional descriptors.

Values of Vendor Summary Description field 1808 and Detailed Description field 1810 remain unknown. Vendor Summary Description field 1808 and Detailed Description field 1810 are based on information provided by a vendor billing reference guide such as 900 (shown in FIGS. 9A and 9B). Those fields, among others, may be selected as key fields. If one of those fields is selected as the most likely descriptor for a derivative billing event identifier, the value of the most likely descriptor would be inserted into the appropriate billing event record.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, apparatus and methods for processing invoice data have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for processing invoice data, the apparatus comprising:

a processor module; and a machine memory module; wherein:

the processor module includes hardware that is configured to:

extract from an invoice a billing event identifier that identifies a billing event;

query an index in the machine memory module for a billing event descriptor that is designated for the billing event;

when a result of the query includes the billing event descriptor, join the billing event descriptor to a record corresponding to the billing event descriptor; and when the result of the query is null:

formulate a billing event identifier derivative;

identify in the index a provisional billing event descriptor that corresponds to the billing event identifier derivative;

join the provisional billing event descriptor to the record corresponding to the billing event identifier; and set a flag in the record to indicate a presence of the provisional billing event descriptor.

2. The apparatus of claim 1 wherein:

the invoice is a first invoice;

the billing event identifier is a first billing event identifier; and the processor module hardware is further configured to:

extract a plurality of second billing event identifiers from a second invoice; and identify, in the index, the billing event descriptor or the provisional billing event descriptor for each of the plurality of second billing event identifiers.

3. The apparatus of claim 2 further comprising a receiver module that includes hardware that is configured to:

receive the first invoice from a first vendor; and receive the second invoice from a second vendor.

4. The apparatus of claim 1 wherein the processor module hardware is further configured to:

formulate the billing event identifier derivative by removing a character from the billing event identifier; and query the machine memory index for a billing event descriptor that corresponds to the billing event identifier derivative.

5. The apparatus of claim 4 wherein the processor module hardware is further configured to iteratively, when a result of the querying is null:

reformulate the derivative, by removing successive characters from the billing event identifier, and query the machine memory index for a billing event descriptor that corresponds to the billing event identifier derivative.

6. The apparatus of claim 5 wherein the processor module hardware is further configured to join a default billing event descriptor to the record corresponding to the billing event identifier.

7. The apparatus of claim 5 wherein the processor module hardware is further configured to terminate the reformulating after a critical number of characters is removed from the billing event identifier.

8. The apparatus of claim 1 wherein the processor module hardware is further configured to:

extract from the invoice a billing event information item that corresponds to the billing event identifier;

calculate an objective closeness metric for each billing event descriptor in the index, each metric corresponding to a closeness between the descriptor and the respective billing event information item; and define as the provisional billing event descriptor the billing event descriptor that, based on the closeness metric, is closest to the information item.

9. The apparatus of claim 8 further comprising a receiver module that includes hardware that is configured to receive a confirmed billing event descriptor that corresponds to the provisional billing event descriptor.

10. The apparatus of claim 9 wherein the processor module hardware is further configured to adjust, based on a difference between the confirmed billing event descriptor and the provisional billing event descriptor, a constant upon which the objective closeness metric is based.

11. The apparatus of claim 1 wherein, when the billing event identifier is a first billing event identifier and the record is a first record, the processor module hardware is further configured to:

extract a plurality of second billing event identifiers;

join each second billing identifier to a corresponding second record;

perform an analytical operation on each of the second records; and perform the analytical operation on the first record.

12. The apparatus of claim 5 wherein, after the iteratively reformulating and querying, the processor module hardware is further configured to join a default billing event descriptor to the record corresponding to the billing event identifier if the querying does not generate a non-null result.

13. The apparatus of claim 1 wherein, wherein the processor module hardware is further configured to:

cull the machine memory index for candidate billing event descriptors that correspond to the billing event identifier derivative; and select as the provisional billing event descriptor a closest one of the candidate billing event descriptors.

14. The apparatus of claim 13 wherein the selecting comprises defining as the provisional billing event descriptor the candidate billing event descriptor that is most numerous among the candidate billing event descriptors.

15. The apparatus of claim 1 further comprising using the processor module hardware to generate a first cost metric and a second cost metric;

wherein:

the first cost index is based on the provisional billing event descriptor; and the second cost index is based on a confirmed billing event descriptor.

16. The apparatus of claim 15 wherein:

the first cost index is based on a plurality of billing events; and the second cost index is based on the plurality of billing events.

17. The apparatus of claim 16 further comprising, using the processor module hardware to draw the plurality of billing events from a plurality of invoices.

18. The apparatus of claim 1 the processing module hardware further configured to:

extract from the invoice a procuring entity sub-unit identifier;

query the index for a procuring entity sub-unit descriptor that is designated for the billing procuring entity sub-unit; and join the procuring entity sub-unit descriptor to the record.

* * * * *